(12) United States Patent
Oka

(10) Patent No.: US 6,867,766 B1
(45) Date of Patent: Mar. 15, 2005

(54) IMAGE GENERATING APPARATUS, IMAGE GENERATING METHOD, ENTERTAINMENT SYSTEM, AND RECORDING MEDIUM

(75) Inventor: Masaaki Oka, Kanagawa (JP)

(73) Assignee: Sony Computer Entertainment Inc. (JP)

(*) Notice: Subject to any disclaimer, the term of this patent is extended or adjusted under 35 U.S.C. 154(b) by 0 days.

(21) Appl. No.: 09/577,736

(22) Filed: May 23, 2000

(30) Foreign Application Priority Data

May 25, 1999 (JP) .......................................... P11-145686

(51) Int. Cl.$^7$ .............................................. G06T 15/00
(52) U.S. Cl. ..................................................... 345/419
(58) Field of Search ................................. 345/419, 422, 345/473; 382/265, 216, 225, 228, 181

(56) References Cited

U.S. PATENT DOCUMENTS 5,063,351 A * 11/1991 Goldthorp et al. .......... 324/603

OTHER PUBLICATIONS

Lee, J., "Point Pattern Analysis With Density Estimation for Frequency Data", Proceedings of Geographic Information Systems, vol. 2, Nov. 14–16, 1995, pp. 598–607.

S.G. O'Brien, D. H. Tofsted, "Physics–based Visualization of Dense Natural Clouds. II. Cloud–rendering Algorithm", Applied Optics, vol. 37, No. 33, Nov. 20, 1998, pp. 7680–7688.

Miyata, K., "A Method of Generating Cloud Images Using Density Contour Lines", Transactions of the Institute of Electronics, Information and Communication Engineers, Tokyo, Japan, vol. E72, No. 6, Jun. 1, 1989, pp. 763–770.

Nishita, T. et al., "Display of Clouds Taking Into Account Multiple Anisotropic Scattering and Sky Light", Computer Graphics Proceedings, New York, New York, Aug. 4, 1996, pp. 379–386.

Bentley, Chris L., "Animating Multidimensional Scaling to Visualize Large N–Dimensional Data Sets", 1996, pp. 1–10.

* cited by examiner

*Primary Examiner*—Almis R. Jankus
(74) *Attorney, Agent, or Firm*—Lerner, David, Littenberg, Krumholz & Mentlik, LLP.

(57) ABSTRACT

An image generating apparatus and image generating method determine the distribution state of dot-sequences on a two-dimensional screen using two-dimensional Gaussian distribution in the event that the plurality of dot-sequences randomly exist in a sphere within the three-dimensional space, an generate an image of dot-sequences on the two-dimensional screen based on the distribution state on the two-dimensional screen. The two-dimensional Gaussian distribution can be factored to the product of one-dimensional Gaussian distributions, and the one-dimensional Gaussian distributions can be generated by uniform random numbers. Thus, it is easy to create an image by projecting a plurality of dot-sequences randomly existing in a three-dimensional space onto a two-dimensional screen.

75 Claims, 8 Drawing Sheets

IMAGE GENERATING APPARATUS, IMAGE GENERATING METHOD, ENTERTAINMENT SYSTEM, AND RECORDING MEDIUM

BACKGROUND OF THE INVENTION

1. Field of the Invention

The present invention relates to an image generating method, image generating apparatus, entertainment system, and recording medium, applicable to generating and displaying three-dimensional object images in real-time, with limited hardware resources such as an entertainment system such as a video game apparatus or a personal computer.

More specifically, the present invention relates to three-dimensional computer graphics processing, and relates to an image generating apparatus, image generating method, entertainment system, and recording medium, for displaying dot-sequences (groups of dots) on a two-dimensional screen, following probability distribution in a three-dimensional space.

2. Background of the Invention

In computer graphics processing, there are cases wherein a plurality of randomly-existing dots in three-dimensional space must be displayed on a two-dimensional hypothetical screen. Such multiple randomly-existing dots in three-dimensional space are used for example in cases of representing screen background clouds, waves on water, trees luxuriant with leaves, and so forth, with groups of extremely small dot groups. That is, such objects to be drawn are represented by groups of extremely small polygons, so the apex coordinates of the polygon, the center point thereof, etc., can be understood as groups of dots (dot-sequences).

Conventionally, with computer graphics, there has been the need to calculate the coordinates values for each dot of dot-sequences existing in a three-dimensional space making up such clouds, waves, leaves, etc., and then display on a two-dimensional hypothetical screen.

However, since the distance from the point of view to each of the extremely great number of points making up the object being drawn differs for each point, so the number of calculations for coordinates conversion, perspective conversion, etc., is extremely great, and this has been a load on the CPU (Central Processing Unit) of the computer and other peripheral devices.

In other words, the number of calculations for such coordinates conversion, perspective conversion, etc., is extremely great when performing real-time high-speed drawing computation of object images which sequentially change on an entertainment system such as a video game apparatus, and this has been a problem.

SUMMARY OF THE INVENTION

Accordingly, the present invention has been made in light of the above problem, and it is an object thereof to provide a new image generating apparatus, image generating method, entertainment system, and recording medium, relating to computer graphics processing, for projecting dot-sequences randomly existing in three-dimensional space on a hypothetical two-dimensional screen.

According to a first aspect of the present invention, an image generating apparatus for projecting a plurality of dot-sequences existing in a three-dimensional space upon a hypothetical two-dimensional screen comprises means for determining the distribution state on the two-dimensional screen based on the distribution state of dot-sequences in the event that the plurality of dot-sequences randomly exist in a sphere within the three-dimensional space, so that an image of dot-sequences is generated on the two-dimensional screen based on the distribution state on the two-dimensional screen.

According to a second aspect of the present invention, an image generating apparatus for projecting a plurality of dot-sequences existing in a three-dimensional space upon a hypothetical two-dimensional screen comprises means for determining the distribution state on the two-dimensional screen based on the distribution state of dot-sequences, point of view, and direction of view, in the event that the plurality of dot-sequences randomly exist in a domain (for example, sphere) within the three-dimensional space, so that an image of dot-sequences is generated on the two-dimensional screen based on the distribution state on the two-dimensional screen.

With the above image generating apparatus, the probability density function g(x, y) which is the distribution state of dot-sequences on a two-dimensional screen may be determined by $$g(x,y)=\int_0^\infty f(X,Y,Z)\cdot(Z/h)^2 dZ$$

wherein the direction from the point of view toward the plurality of dot-sequences is stipulated as the Z-axis;
the two-dimensional screen is placed on the X-Y plane;
the probability density function for the plurality of dot-sequences existing within the three-dimensional space is f(X, Y, Z);
the distance from the point of view to the screen is represented by h; and
the distance from the point of view to the dot-sequences existing within the three-dimensional space is represented by Z.

Also, the probability density function g(x, y) which is the distribution state of dot-sequences on a two-dimensional screen may be determined by $$g(x,y)=\int_0^\infty f(x\cdot Z/h, y\cdot Z/h, Z)\cdot(Z/h)^2 dZ$$

wherein the direction from the point of view toward the plurality of dot-sequences is stipulated as the Z-axis;
the screen is placed on the X-Y plane;
the probability density function for the plurality of dot-sequences existing within the three-dimensional space is f(X, Y, Z);
the distance from the point of view to the screen is represented by h; and
the distance from the point of view to the dot-sequences existing within the three-dimensional space is represented by Z.

Such multiple dot-sequences existing within the three-dimensional space may be apex coordinates for drawing objects with polygons. The objects may be clouds, water surface, or tree leaves, for example, existing within the three-dimensional space.

According to a third aspect of the present invention, an image generating apparatus for projecting a plurality of dot-sequences existing in a three-dimensional space upon a hypothetical two-dimensional screen comprises means for determining the distribution state on the two-dimensional screen using uniform random numbers, in the event that the plurality of dot-sequences randomly exist in a sphere within the three-dimensional space, so that an image of dot-sequences is generated on the two-dimensional screen based on the distribution state on the two-dimensional screen.

According to a fourth aspect of the present invention, an image generating apparatus for projecting a plurality of dot-sequences existing in a three-dimensional space upon a hypothetical two-dimensional screen comprises means for determining the distribution state on the two-dimensional screen using two-dimensional Gaussian distribution, in the event that the plurality of dot-sequences randomly exist in a sphere within the three-dimensional space, so that an image of dot-sequences is generated on the two-dimensional screen based on the distribution state on the two-dimensional screen.

According to a fifth aspect of the present invention, an image generating method for projecting a plurality of dot-sequences existing in a three-dimensional space upon a hypothetical two-dimensional screen comprises the following steps:

determining distribution state of dot-sequences in the event that the plurality of dot-sequences randomly exist in a sphere within the three-dimensional space;

determining the distribution state on the two-dimensional screen, based on the distribution state of the plurality of dot-sequences in the three-dimensional space; and generating an image of dot-sequences on the two-dimensional screen, based on the distribution state on the two-dimensional screen thus determined.

According to a sixth aspect of the present invention, an image generating method for projecting a plurality of dot-sequences existing in a three-dimensional space upon a hypothetical two-dimensional screen comprises the following steps:

determining the distribution state of dot-sequences, point of view, and direction of view, in the event that the plurality of dot-sequences randomly exist in a sphere within the three-dimensional space;

determining the distribution state on the two-dimensional screen, based the determined distribution state, point of view, and direction of view; and generating an image of dot-sequences on the two-dimensional screen, based on the distribution state on the two-dimensional screen thus determined.

According to a seventh aspect of the present invention, an image generating method for projecting a plurality of dot-sequences existing in a three-dimensional space upon a hypothetical two-dimensional screen comprises the following steps in the event that the plurality of dot-sequences randomly exist in a sphere within the three-dimensional space:

determining the distribution state on the two-dimensional screen, using uniform random numbers; and generating an image of dot-sequences on the two-dimensional screen, based on the determined distribution state on the two-dimensional screen.

According to an eighth aspect of the present invention, an image generating method for projecting a plurality of dot-sequences existing in a three-dimensional space upon a hypothetical two-dimensional screen comprises the following steps in the event that the plurality of dot-sequences randomly exist in a sphere within the three-dimensional space:

determining the distribution state on the two-dimensional screen, using two-dimensional Gaussian distribution; and generating an image of dot-sequences on the two-dimensional screen, based on the determined distribution state on the two-dimensional screen.

Such an image generating apparatus or image generating method may be employed in an entertainment system comprising at least a control system, a graphics system, a sound system, and an optical disk control unit.

Also, such a image generating method may be employed as a recording medium upon which has been recorded these steps.

With the present invention, the distribution density (probability density function) of dot-sequences on a two-dimensional screen regarding dot-sequences randomly existing in a three-dimensional space can be obtained based on the distribution density (probability density function), point of view, and direction of view of the dot-sequences in the three-dimensional space, without performing coordinates conversion, perspective conversion, etc., for each individual point.

Further, with the present invention, the distribution of dot-sequences on a two-dimensional screen regarding dot-sequences randomly existing in a three-dimensional space can be obtained by using two-dimensional Gaussian distribution without performing coordinates conversion, perspective conversion, etc., for each individual point, by means of employing an appropriate rule of approximation. This two-dimensional Gaussian distribution can be represented as the product of one-dimensional Gaussian distributions. Further, one-dimensional Gaussian distributions can be easily generated using uniform random numbers.

Accordingly, the load on the CPU, GTE, and other computing means is lightened, and high-speed graphic processing can be realized.

DESCRIPTION OF THE PREFERRED EMBODIMENTS

The following is a detailed description of the embodiments according to the present invention, with reference to the attached drawings.

Entertainment System

First, an example of an entertainment system capable of carrying out the three-dimensional graphics according to the present invention will be briefly described with reference to the drawings.

Figure 1:
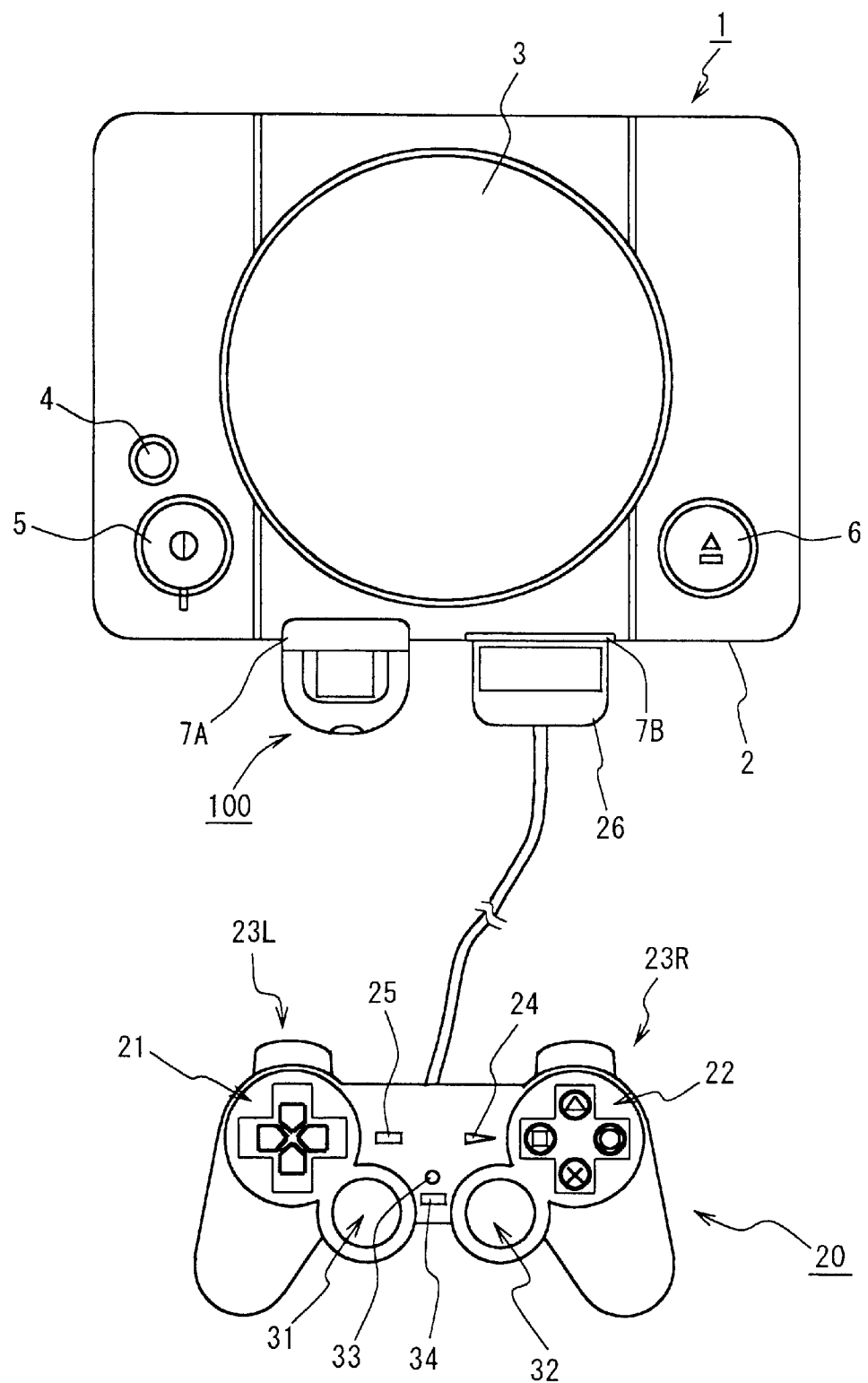
FIG. 1 is a diagram illustrating the exterior view of a video game apparatus as an example of an entertainment system for carrying out the present invention.

FIG. 1 is a diagram illustrating the exterior view of a video game apparatus as an example of an entertainment system. This video game apparatus 1 is for reading out a game program recorded in an optical disk for example, and executing the game based on instructions from a user (game player). Incidentally, the term "executing the game" primarily refers to controlling progression, display, and audio of the game.

The main unit 2 of the video game apparatus 1 is configured having at the center thereof a disk mounting unit 3 where an optical disk such as a CD-ROM which is the recording medium for supplying application programs such as video games and the like is mounted, a reset switch 4 for arbitrarily resetting the game, an electric power source switch 5, a disk operating switch 6 for operating the mounting of the optical disk, and two slots portions 7A and 7B, for example.

Two operating devices 20 can be connected to the slot portions 7A and 7B, so that two users can compete. Also, memory card devices which can be used to save (store) and read out game data, and portable electronic devices which can be detached from the main unit and execute the game, can be inserted into these slot portions 7A and 7B.

The operating device 20 has first and second operating units 21 and 22, a left button 23L, a right button 23R, a start button 24, and a selecting button 25, and further has operating units 31 and 32 which are capable of analog operation, a mode selection switch 33 for selecting the operating mode for these operating units 31 and 32, and a display unit 34 for displaying the selected operating mode.

Figure 2:
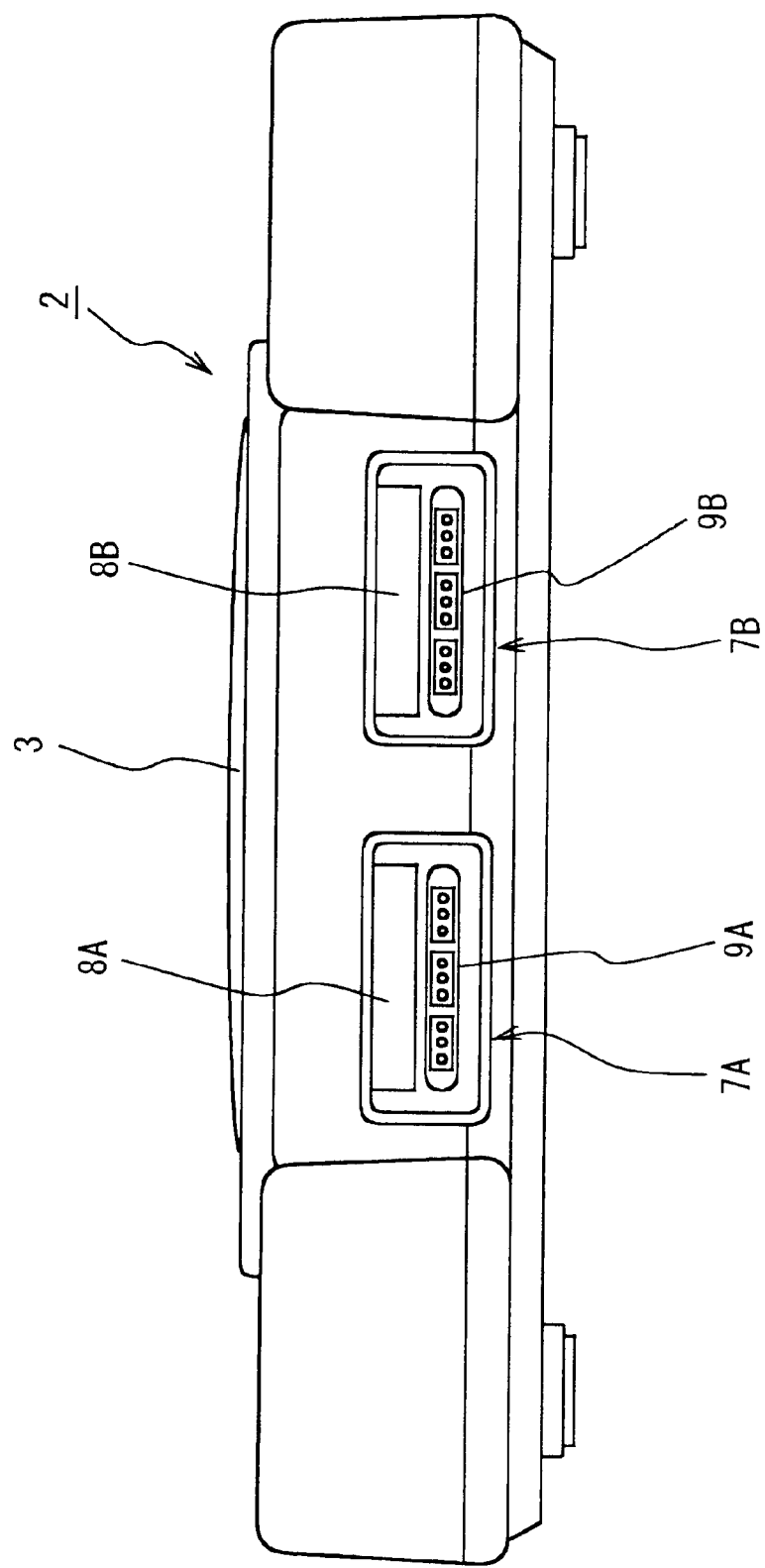
FIG. 2 is a diagram illustrating the front of the video game apparatus shown in FIG. 1.

FIG. 2 illustrates the slot portions 7A and 7B provided to the front of the main unit 2 of the video game apparatus 1. The slot portions 7A and 7B are each formed in two tiers, with memory card insertion portions 8A and 8B to which memory cards 10 or portable electronic devices 100 are mounted formed to the upper tier thereof, and controller connection portions (jacks) 9A and 9B to which the connecting terminal portion (connector) 26 of the connector 20 is connected formed to the lower tier thereof.

The insertion holes (slots) of the memory card insertion portions 8A and 8B are formed somewhat asymmetrically, so there is no erroneous insertion of memory cards. On the other hand, the controller connection portions 9A and 9B are also formed somewhat asymmetrically, so there is no erroneous insertion of connecting terminal portions 26 of the controllers 20, and also formed so as to have a insertion hole shape differing from that of the memory card insertion portions 8A and 8B, so there is no erroneous insertion of memory cards.

Figure 3:
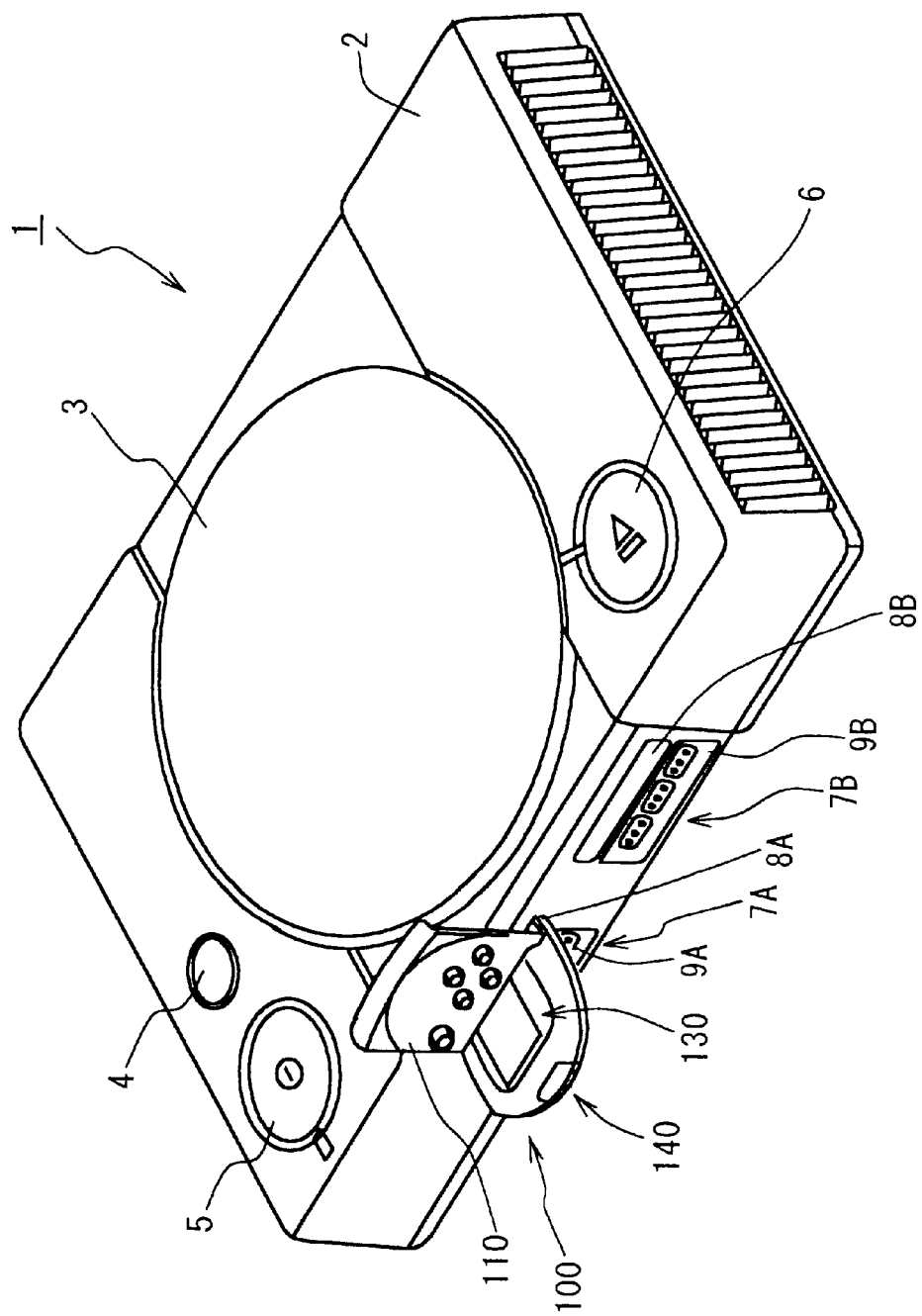
FIG. 3 is a diagram illustrating the video game apparatus shown in FIG. 1 with a portable electronic device inserted.

FIG. 3 illustrates a state wherein a portable electronic device 100 has been inserted into the memory card insertion portion 8A of the slot portion 7A at the front of the video game apparatus 1.

Figure 4:
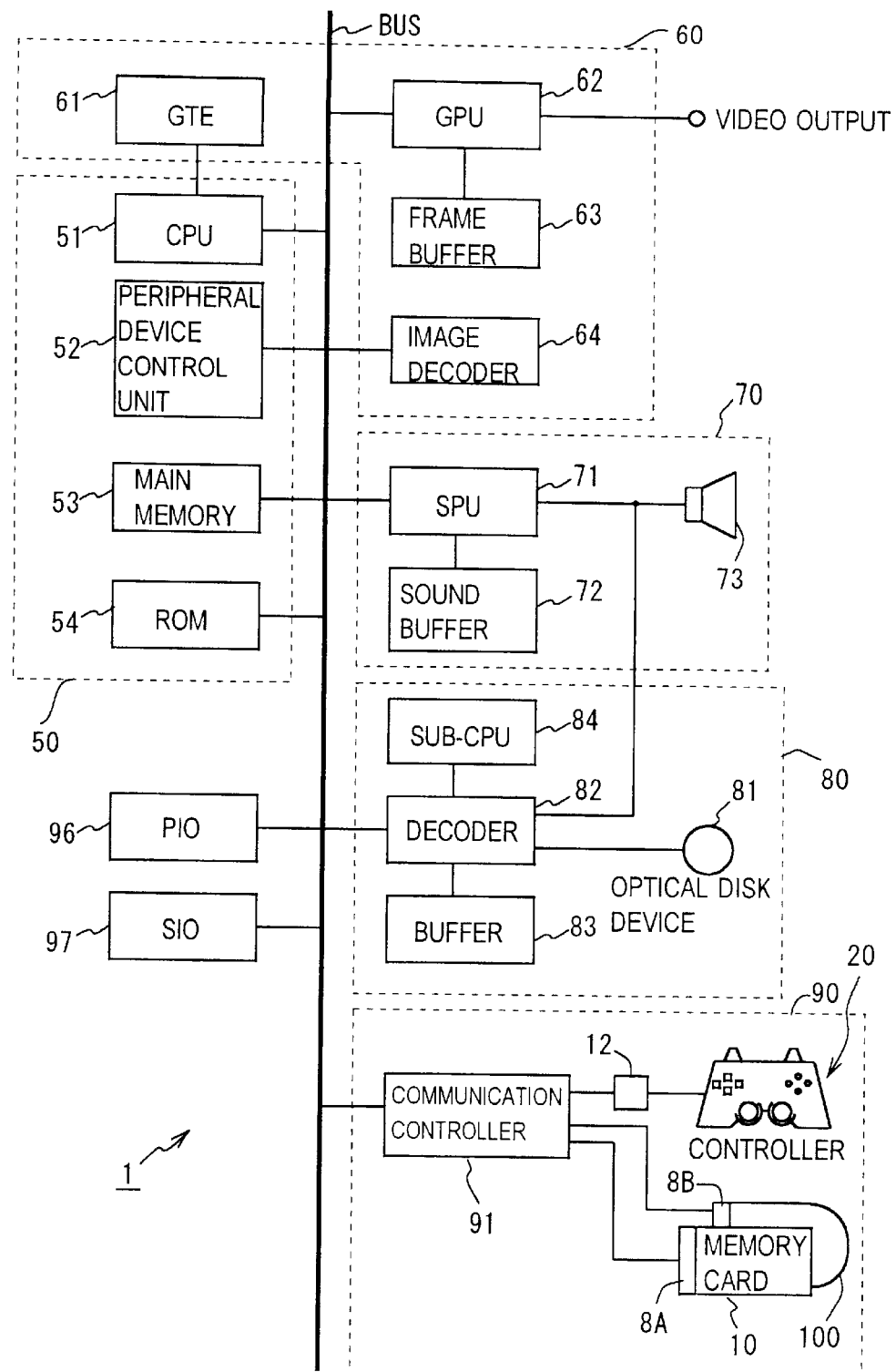
FIG. 4 is a diagram illustrating an example of a schematic circuit configuration of the principal portions of the video game apparatus shown in FIG. 1.

Next, FIG. 4 is a block diagram illustrating an example of a schematic circuit configuration of the principal portions of the video game apparatus 1.

This video game apparatus 1 is made up of a control system 50 comprising a CPU (Central Processing Unit) 51 and devices peripheral thereto and the like; a graphic system 60 comprising a GPU (Graphic Processing Unit) 62 for performing drawing to a frame buffer 63 and so forth; a sound system 70 comprising an SPU (Sound Processing Unit) and the like for generating music, sound effects, etc.; an optical disk control unit 80 for performing control of optical disks upon which are recorded application programs; a communication control unit 90 for controlling signals from the controllers 20 whereby instructions are input from the users, and input and output of data from and to memory cards 10 for storing game settings and the like and later-described portable electronic devices 100; a bus BUS to which the above components are connected; and so forth.

The control system 50 is provided with a CPU 51, a peripheral device control unit 52 for performing interruption control, control of DMA (Dynamic Memory Access), etc., main memory (main storage device) 53 made up of RAM (Random Access Memory), and ROM (Read-Only Memory) 54 storing programs such as the so-called operating system which manages the main memory 53, graphic system 60, sound system 70, and so forth. Now, the term main memory 53 here refers to such whereby programs can be executed thereupon.

The CPU 51 is for controlling the entire video game apparatus 1 by executing the operating system stored in the ROM 54, and is made up of a 32-bit RISC (Reduced-Instruction Set Computer) CPU, for example.

Once the power is turned on to this video game apparatus 1, the CPU 51 of the control system 50 controls the graphic system 60, sound system 70, etc., by executing the operating system stored in the ROM 54.

Also, once the operating system is executed, the CPU 51 performs initialization of the entire video game apparatus 1 such as checking operation and so-forth, following which the CPU 51 controls the optical disc control unit 80 to execute application programs such as a game stored in the optical disk. By means of executing the programs such as games, the CPU 51 controls the graphic system 60, sound system 70, etc., according to input from the user, to control image display, and generation of sound effects and music.

Also, the graphics system 60 is provided with a graphics data generating processor or a GTE (Geometry Transfer Engine) 61 for performing processing such as coordinates conversion and the like, a GPU (Graphic Processing Unit) 62 for performing drawing by following the drawing instructions from the CPU 51, a frame buffer 63 for storing image drawn by this GPU 62, and an image decoder 64 for decoding image data compressed and encoded by orthogonal transformation such as discrete cosine transformation and the like.

The GTE 61 functions as a co-processor of the CPU 51. The GTE 61 has a parallel computer mechanism for executing multiple computations in parallel for example, so as to be able to perform high-speed computation such as coordinates conversion, light source calculation, matrix or vector computation, etc., according to computation requests from the CPU 51. That is, calculation of the apex coordinates of polygons relating to the present invention are carried out in the GTE 61. This GTE 61 is designed such that in the case of performing computation for flat shading wherein a single triangular polygon is drawn in a single color, the GTE 61 is capable of performing coordinates computation for up to around 1,500,000 polygons per second, and accordingly, this video game apparatus reduces the load on the CPU 51, and realizes high-speed coordinates computation.

Also, the GPU 62 operates following polygon drawing commands from the CPU 51. The GPU 62 has a two-dimensional address space independent from the CPU 51, and performs drawing of polygons and the like to the frame buffer 63 which is this address space. This GPU 62 is designed to be able to draw up to around 630,000 polygons per second.

Further, the frame buffer 63 is made up of a so-called dual port RAM, and is capable of simultaneously performing drawing from the GPU 62 or transfer from the main memory 53, and reading for display. This frame buffer 63 has capacity of 1 megabyte for example, which is handled as a matrix of 1024 horizontal pixels by 512 vertical pixels, each pixel being 16 bits.

Also provided to this frame buffer 63, besides the display area output as video output, is a CLUT (Color Look-Up Table) area storing a CLUT to which the GPU 62 makes reference at the time of drawing polygons and the like, and a texture area for storing textures which are inserted into the polygons and the like, subjected to coordinates conversion at the time of drawing, and drawn by the GPU 62 (i.e., mapped). The CLUT area and texture area are dynamically updated according to change in the display area and so forth.

Also, the GPU 62 is designed so as to be able to perform, in addition to flat shading, Gouraud shading wherein the color within a polygon is determined by interpolating from the color of the apexes of the polygon, and texture mapping wherein textures stored in the texture area are pasted onto the polygon. In the event of performing such Gouraud shading or texture mapping, the GTE 16 is capable of performing coordinates calculations for up to around 500,000 polygons per second.

Further, the image decoder 64 decodes still or motion image data stored in the main memory 53 based on control from the CPU 51 and stores this in the main memory 53.

Also, this regenerated image data is stored in the frame buffer 63 via the GPU 62, thus enabling it to be used for image backgrounds drawn by the above GPU 62.

The sound system 70 is provided with an SPU 71 which generates music, sound effects, etc., based on instructions from the CPU 51, a sound buffer 72 wherein waveform data and the like is stored by this SPU 71, and a speaker 73 for outputting the music, sound effects, etc., generated by the SPU 71.

The SPU 71 is provided with ADPCM decoding functions for playing sound data subjected to ADPCM (Adaptive Differential PCM encoding by taking 16-bit audio data as 4-bit differential signals for example, playing functions for generating sound effects and the like by playing the waveform data stored in the sound buffer 72, modulating functions for modulating and playing the waveform data stored in the sound buffer 72, and so forth.

Having such functions allows the sound system 70 to be used as a so-called sampling sound source wherein music, sound effects, etc., are generated based on the waveform data recorded in the sound buffer 72, based on instructions from the CPU 51.

The optical disk control unit 80 is provided with an optical disk device 81 for playing recorded programs and data and the like stored in the optical disk, a decoder 82 for decoding programs and data and the like to which are added ECC (Error Correction Code) for example, and a buffer 83 for realizing high-speed data reading from the optical disk by means of temporarily storing the data from the optical disk device 81. A sub-CPU 84 is connected to the decoder 82.

Also, in addition to the above ADPCM data for the audio data recorded in the optical disk to be read out with the optical disk device 81, there is so-called PCM data, which is audio signals subjected to analog/digital conversion.

The audio data recorded by representing 16-bit digital data as 4-bit differential signals for example for ADPCM data is decoded by the decoder 82, supplied to the above SPU 71, subjected to digital/analog conversion and the like by the SPU 71, and then used for driving the speaker 73.

Also, audio data recorded as 16-bit digital data for example for PCM data is decoded by the decoder 82, then used for driving the speaker 73.

Further, the communication control unit 90 has a communication control device 91 for performing control of communication with the CPU 51 via the bus BUS, with the controller connecting portion 12 to which controllers 20 for inputting instructions from the user are connected, and memory card insertion portions 8A and 8B to which memory cards 10 serving as auxiliary storing devices for storing game setting data and the like and the later-described portable electronic devices 100 are connected, being provided to this communication control device 91.

The controller 20 connected to the controller connecting portion 9 has 16 instructing keys for example for inputting instructions from the user, and makes transmission by synchronous communication to the communication control device 91 around 60 times per second regarding the state of the instruction keys according to instructions from the communication control device 91. The communication control device 91 then sends the instruction key state of the controller 20 to the CPU 51.

Thus, the instructions from the user are input to the CPU 51, and the CPU 51 performs processing according to the instructions from the user, based on the game program or the like which is being executed.

Now, regarding the main memory 53, GPU 62, image decoder 64, decoder 82, and so forth, there is the need to transfer large amounts of image data a high speeds at the time of reading the program, displaying images, drawing images, etc. Accordingly, this video game apparatus is designed so as to perform so-called DMA transfer wherein data transfer is performed directly between the main memory 53, GPU 62, image decoder 64, decoder 82, and so forth, under control of the peripheral device control unit 52, without going through the CPU 51. Thus, the load on the CPU 51 due to data transfer can be reduced, and high-speed data transfer can be performed.

Also, in the event that the CPU 51 needs to store game settings data and the like for the game being executed, the data to be stored is transferred to the communication control device 91, and the communication control device 91 writes the data from the CPU 51 to a memory card 10 or portable electronic device 100 inserted in the slot of a memory card insertion portion 8A or 8B.

Now, the communication control device 91 has built in a protective circuit for preventing electrical destruction. The memory card 10 and portable electronic device 100 are separated from the bus BUS, and can be mounted or detached with the electric power turned on to the main unit. Accordingly, a new memory card can be inserted without turning off electric power to the main unit, in the event that the storage capacity of the memory card 10 or portable electronic device 100 is found to be insufficient, or in other like cases. Consequently, a new memory card can be inserted and the necessary data can be written to the new memory card, without losing any of the game data which needs to be backed up.

Also, the parallel I/O interface (PIO) 96 and serial I/O interface (SIO) 97 are interfaces for connecting the memory card 10 or portable electronic device 100 to the video game apparatus 1.

With the above-described entertainment system, high-speed computation using approximation calculations at the time of performing the perception conversion according to the present embodiment.

Three-dimensional Graphics

Three-dimensional graphics is an art relating to calculating how an object placed in three-dimensional space on a screen assumed at a certain position is perceived when viewing the object from a certain point of view.

The GTE 61 functions as a co-processor for performing high-speed geometry computation. Of such high-speed computations, a typical geometry computation is provided to the game programmer in the format of a library, for example. In the following description, the approximation calculation for perception conversion capable of obtaining the same results with a simple method at the time of conducting perception of dot-sequences randomly distributed in a three-dimensional space onto a two-dimensional screen can be prepared as a basic geometry library for example, and provided to game software programmers.

Figure 5:
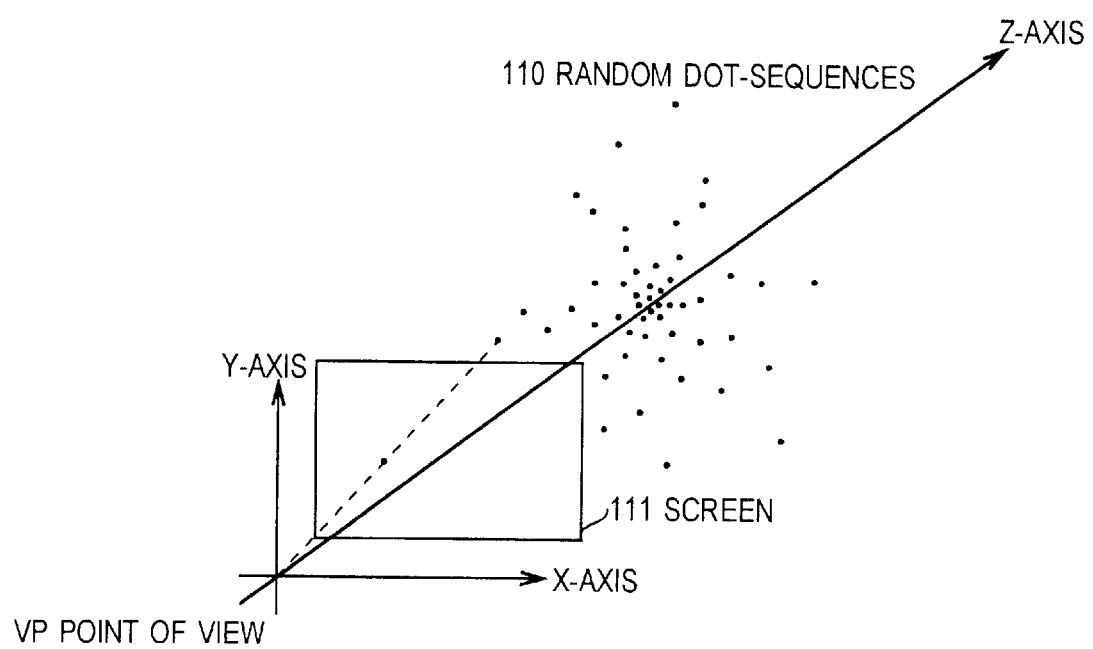
FIG. 5 is a diagram describing the manner in which multiple randomly-existing dots (dot-sequence) in three-dimensional space are projected on a two-dimensional screen.

FIG. 5 is a diagram for describing the projection of the multiple dot-sequences. 110 randomly existing in a three-dimensional space onto a two-dimensional screen 111. Here, the multiple dot-sequences 110 randomly distributed in three-dimensional space exist as the object of drawing. In order to display the object of three-dimensional drawing on a two-dimensional display device (television set, monitor, etc.), there is the need to make a three-dimensional representation on a hypothetical two-dimensional screen 111 beforehand. Accordingly, there is the need to project the three-dimensional dot-sequences 110 onto the hypothetical two-dimensional screen 111.

The point-of-view coordinates axes in the three-dimensional space surrounding the point of view VP are thus: the direction from the point of view VP toward the random dot-sequences 110 is the Z-axis, the horizontal direction of the screen 111 is the X-axis, and the vertical direction of the screen 111 is the Y-axis.

The Current State of Graphics

Figure 6:
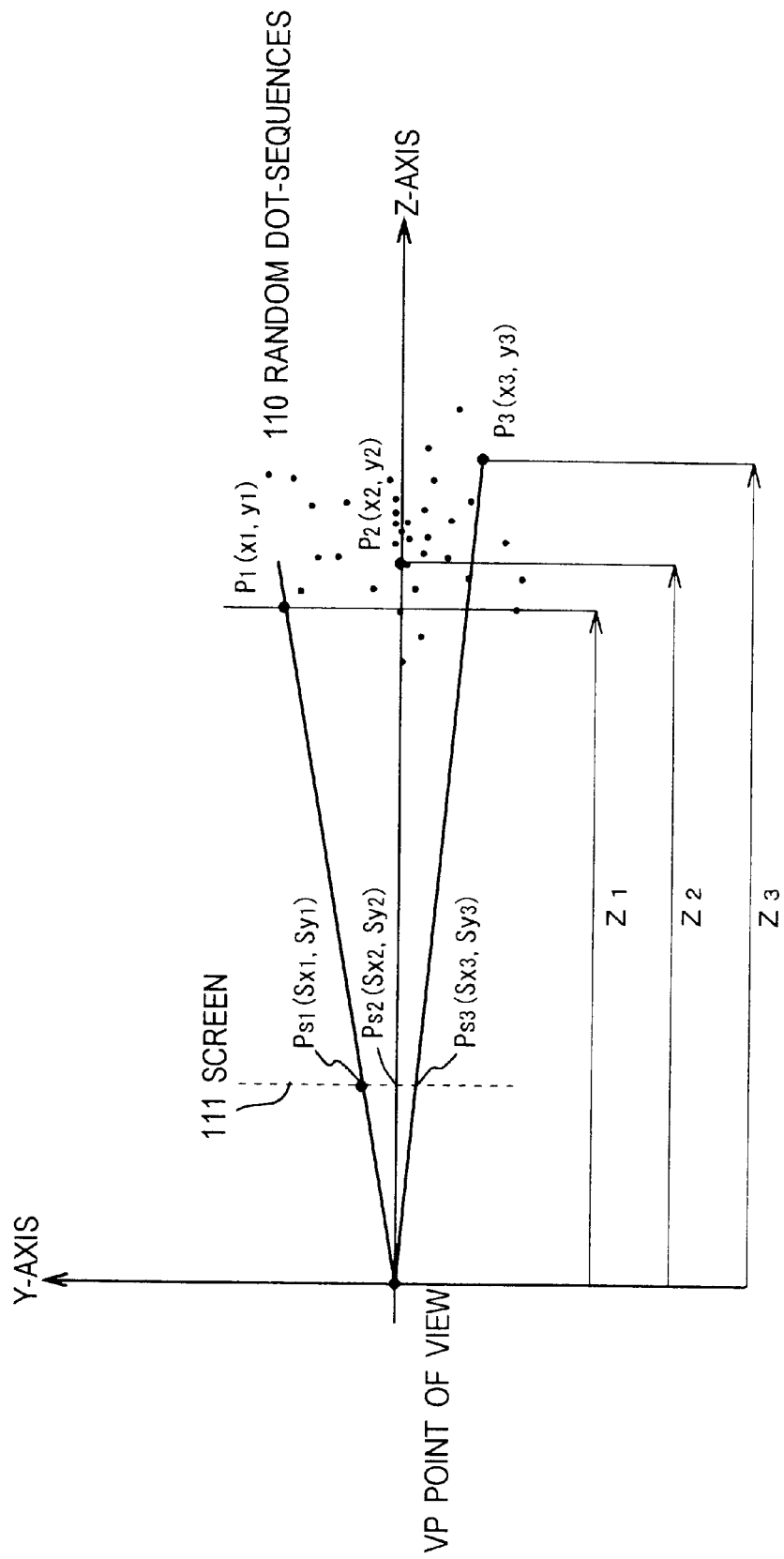
FIG. 6 is a diagram describing an example of perspective conversion wherein randomly-existing dot-sequences in three-dimensional space in the current state are projected on a two-dimensional screen.

FIG. 6 is a diagram illustrating an example of perspective conversion for projecting dot-sequences randomly existing in a three-dimensional space onto a hypothetical two-dimensional screen. Of the random dot-sequences 110, representative points P1, P2, and P3 will be described. The coordinates of the points P1, P2, and P3 are P1 (X1, Y1), P2 (X2, Y2), and P3 (X3, Y3), respectively. With the distance from the point of view VP to the points P1, P2, and P3 as Z1, Z2, and Z3, and the distance from the point of view VP to the screen as h, the coordinates values Ps1 (Sx1, Sy1), Ps2 (Sx2, Sy2), and Ps3 (Sx3, Sy3) of the points P1, P2, and P3 making up the random dot-sequence 110 on the screen 111 can be calculated using the following calculations, using triangles in a homothetic relation.

$$Sx1 = X1 \times (h/Z1),\ Sy1 = Y1 \times (h/Z1) \quad (1)$$

$$Sx2 = X2 \times (h/Z2),\ Sy2 = Y2 \times (h/Z2) \quad (2)$$

$$Sx3 = X3 \times (h/Z3),\ Sy3 = Y3 \times (h/Z3) \quad (3)$$

The reason for performing this calculation is as follows. The distance from the point of view VP to the screen is a constant h, but the distance from the point of view VP to the three points P1, P2, and P3 are each different, i.e., Z1, Z2, and Z3, so the homothetic ratios also differ, i.e., (h/Z1), (h/Z2), and (h/Z3).

In the event that the dot-sequence randomly existing in the three-dimensional space is configured of an N number of dots, the calculations of the expressions (1) through (3) must be repeated for the number of points, i.e., N times, in order to calculate the coordinates on the screen.

First Embodiment

Now, let us assume that the randomly distributed dot-sequences existing in the three-dimensional space are dot-sequences uniformly distributed within a sphere.

Figure 7:
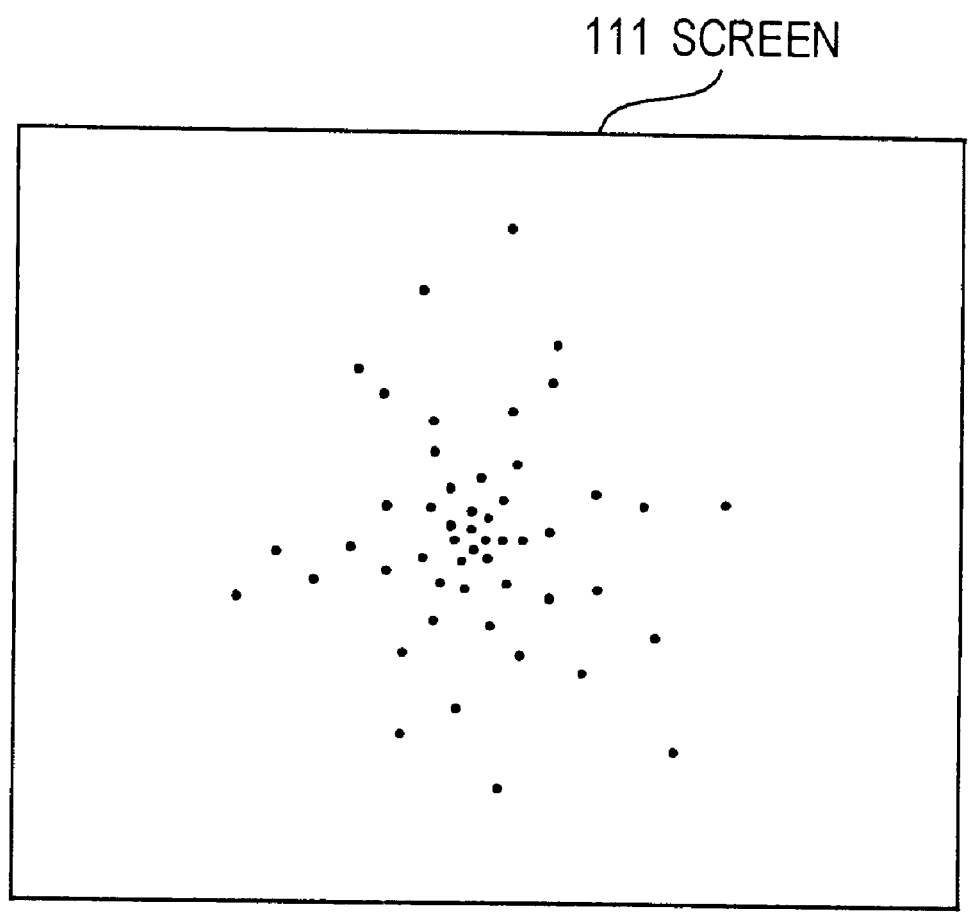
FIG. 7 is a diagram illustrating the state of dot-sequence distribution of randomly-existing dot-sequences in three-dimensional space having been projected on a two-dimensional screen.

FIG. 7 is a diagram illustrating the results of randomly-existing dot-sequences in such a three-dimensional space having been projected on a two-dimensional screen in the direction of view (i.e., in the Z-axial direction).

In the event of projecting such dot-sequences on a two-dimensional screen, the overall distribution of the projected dot-sequences exists within a circle, with the distribution being denser (darker) at the center position, growing gradually sparser in the radial direction, and becoming the sparsest (lightest) around the perimeter.

Now, with the probability density function for the dot-sequences uniformly existing within the spherical three-dimensional space as f(X, Y, Z), the probability of emergence of dot-sequences can be represented with the following expression:

$$0 \leq f(X,Y,Z) \leq 1 \quad (4)$$

Performing volume integration of this probability density function f(X, Y, Z) over the entire three-dimensional space yields the total probability of emergence of dot-sequences as 1, giving the following expression:

$$\int f(X,Y,Z) dv = 1 \quad (5)$$

Next, the distribution probability of dots in the event of projecting a dot-sequence having the probability density function f(X, Y, Z) and existing in three-dimensional space onto a two dimensional screen will be studied. The probability density function of this dot-sequence on the two dimensional screen 111 is represented by g(X, Y).

Figure 8:
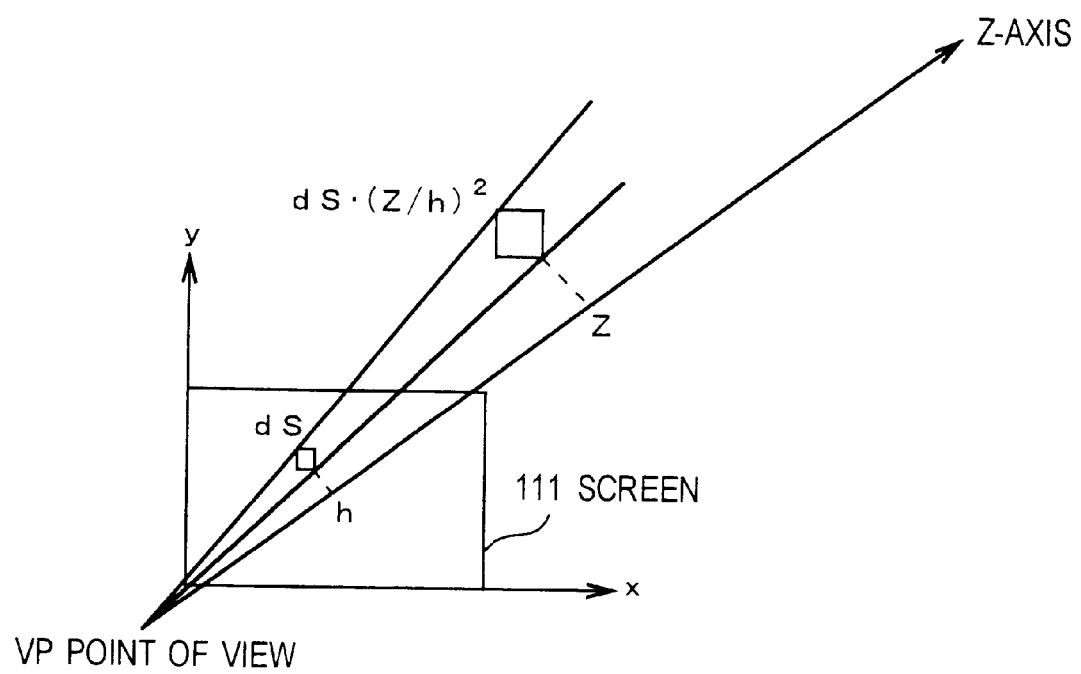
FIG. 8 is a diagram describing the relation between the distribution of dot-sequences in three-dimensional space and the distribution of dot-sequences on the two-dimensional screen.

First, the relation between the three-dimensional space and the two dimensional screen 111 is obtained. As shown in FIG. 8, the area of a square S existing in three-dimensional space projected onto the screen is a minute area dS on the screen. With the distance from the point of view VP to the minute area dS on the screen 111 as h, and the distance from the point of view VP to the square S in three-dimensional space as Z, the square S and the minute area dS are in the relation of the segment ratio (h/Z) squared, thus yielding the following relation.

$$S = dS \cdot (Z/h)^2 \quad (6)$$

The probability of a dot-sequence on the minute area dS on the screen is obtained by integrating the probability of the dot-sequence in the three-dimensional space from the point of view to infinity (0 to ∞) in the form of a pyramid with the base thereof being the square S, and thus can be represented as the following expression:

$$g(x, y) dS = \int_0^\infty f(X, Y, Z) \cdot S\, dZ \quad (7)$$
$$= \int_0^\infty f(X, Y, Z) \cdot (Z/h)^2 dS\, dZ$$

Expression (7) yields Expression (8):

$$g(x, y) = \int_0^\infty f(X, Y, Z) \cdot (Z/h)^2 dZ \quad (8)$$

Now, the following equation for perspective conversion holds between the coordinates (x, y) on the screen and the coordinates (X, Y) in the three-dimensional space:

$$x = X \cdot (h/Z) \quad (9)$$

$$y = Y \cdot (h/Z) \quad (10)$$

Substituting Expressions (9) and (10) into Expression (8) yields the following expression:

$$g(x, y) = \int_0^\infty f(x \cdot Z/h, y \cdot Z/h, Z) \cdot (Z/h)^2 \, dZ \quad (11)$$

Expression (11) can represent the dot-sequence distribution on the two-dimensional screen with the three-dimensional space coordinates values alone, and on the other hand, Expression (11) can represent this with the two-dimensional screen coordinates values alone.

Thus, according to Expression (11), once the probability density function f(X, Y, Z) in three-dimensional space, point of view VP, and direction of view (the Z-axial direction in this case) are determined, the probability density function g(x, y) on the two-dimensional screen can be determined.

Under the conditions that there is no need to display the front and back relationship between dots (i.e., the distance thereof in the Z direction) of the dot-sequence randomly existing in the three-dimensional space, the following can be said. That is, the conventional method of generating random dot-sequences within a three-dimensional space, and performing coordinates conversion and perspective conversion for each point, requires an extremely great number of calculations, which is a massive load on the CPU and GTE which are the computing means.

Instead of performing such calculations, generating dot-sequences having a probability density g(x, y) on the two-dimensional screen as described above yields the same results for the obtained dot-sequence distribution on the screen.

This is advantageous in that generating dot-sequences having a probability density g(x, y) on the two-dimensional screen does away with the necessity for the coordinates conversion and perspective conversion calculations for each point, and once the probability density function f(X, Y, Z), point of view VP, and direction of view are determined, dot-sequences can be generated beforehand. Accordingly, there is the advantage that the load on the processing devices for graphics in an entertainment system, such as the CPU and GTE, can be lightened.

Second Embodiment

The integration expression in Expression (11) can be numerically solved if f(X, Y, Z) is provided. However, under constant conditions, this can be solved in an even simpler manner, using a approximation expression.

Let us say that dot-sequences are uniformly distributed within a sphere in three-dimensional space. Under such conditions, the probability density f(X, Y, Z) of the dot-sequence in the three-dimensional space can be represented with a constant A.

$$f(X,Y,Z) = f(x \cdot Z/h, y \cdot Z/h, Z) = A \quad (12)$$

Substituting Expression (12) into Expression (11) yields the following expression:

$$g(x, y) = \int_0^\infty A \cdot (Z/h)^2 \, dZ \quad (13)$$

Now, Zin and Zout are the point of entry and point of exit of the integration path passing through the surface of the sphere. In the event that the integration path does not pass through the surface of the sphere, Zin=Zout=0 holds.

Further, in the event that the surface of the sphere is sufficiently distant from the point of view (in the event that Z is great), the difference from the point of view to each point making up the dot-sequence (i.e., the amount of change of Z of the dot-sequence within the surface of the sphere) is extremely small in relative considerations, and thus can be viewed as a constant. On the other hand, the distance h from the point of view VP to the screen 111 is a constant. The homothetic ratio (Z/h) hardly changes, so (Z/h) can be viewed as a constant. Accordingly, with (Z/h)$^2$=B, the following expression can be obtained:

$$g(x, y) = \int_0^\infty A \cdot B \, dZ \quad (14)$$

Solving Expression (14) yields the following expression:

$$g(x,y) = A \cdot B (Zout - Zin) \quad (15)$$

According to Expression (15), the dot-sequence distribution on the two-dimensional screen is proportional to (Zout−Zin). This (Zout−Zin) represents to what degree the line of view has passed through the sphere. That is to say, in the event that the line of view has passed through the center portion of the sphere, (Zout−Zin) is a relatively large value, but conversely, in the event that the line of view has near the surface of the sphere, (Zout−Zin) is a relatively small value.

As a result, the probability density function g(x, y) on the two-dimensional screen has a distribution of a great value at the center of a circle corresponding to the center of the sphere, and has a small value at the perimeter (outer side) of the circle corresponding to the perimeter of the sphere.

It can be understood that a distribution having such properties can be representatively approximated by two-dimensional Gaussian distribution. In this case, in order to simplify the expression, the variance of the two-dimensional Gaussian distribution to be approximated is made to be 1 (i.e., $\sigma^2$=1), and the average zero (i.e., ave. x=0).

Accordingly, Expression (11) can be represented as in the following expression:

$$g(x,y) = (1/2\pi) \exp\{-(x^2+y^2)/2\} \quad (16)$$

Factoring the two-dimensional Gaussian distribution expression of Expression (16) allows representation to be made in a form of multiplied one-dimensional Gaussian distributions.

$$g(x,y) = (1/\sqrt{2\pi}) \exp(-x^2/2) \cdot (1/\sqrt{2\pi}) \exp(-y^2/2) \quad (17)$$

The random numbers following the one-dimensional Gaussian distribution can be generated from uniform random numbers using the Box-Muller method.

$$GR = \sqrt{-2\log(R1)} \cdot \cos(2\pi R2) \quad (18)$$

Here, R1 and R2 represent uniform random numbers, and GR represents Gaussian distribution random numbers.

As a result, it can be understood that the distribution g(x, y) on the two-dimensional screen can be created using uniform random numbers.

Incidentally, in order to simplify the Gaussian distribution expression, the variance of the Gaussian distribution is made to be 1, and the average zero. This is under the assumption that the dot-sequences to be drawn exist in three-dimensional space within a constant sphere, and a great number of points are distributed uniformly. In the event that the dot-sequences to be drawn existing in three-dimensional space expand beyond the sphere, the distribution g(x, y) on the two-dimensional screen obtained under the assumption of the sphere containing most of the dot-sequences can be enlarged by an appropriate ratio in the x direction and y direction, according tot the state of the three-dimensional space expanding beyond the sphere.

Thus, in the event of projecting dot-sequences uniformly distributed within a spherical surface onto a two-dimensional screen, the distribution of the dot-sequences on the two-dimensional screen can be obtained simply by using one-dimensional Gaussian distribution random numbers, without coordinates conversion and perspective conversion calculations for each point.

Incidentally, the above-described image generating method may be formed into a program, and provided as a recording medium readable and executable by an entertainment system. This program can be provided either in the state of being individually recorded on a recording medium such as an optical disk, or in the state of having been recorded as a part of game software. These programs are activated on the entertainment system 1, and executed by the CPU 51 thereof.

The meaning of the above-described image generating method being individually recorded as a program on a recording medium is in that the program is prepared beforehand as a library for software development. It is a known fact that creating all functions at the time of developing software requires tremendous amounts of time.

However, breaking down such massive software functions into types reveals that there are many functions common to various types of software, such as the function for moving an object.

Thus, functions capable of being shared as the above-described embodiment can be provided to software manufacturers as library programs. The software manufacturers then only need to create the essential portions of the software, since such commonly-used functions can be provided externally as programs.

According to the above-described embodiment, in computer graphics, dot-sequences distributed in three-dimensional space can be simply projected on a two-dimensional screen, without placing a load on the CPU, GTE, and other coordinates computing means. Objects of drawing which randomly exist in three-dimensional space, such as clouds, water surface, and tree leaves, can thus be calculated using one-dimensional Gaussian distribution random numbers.

According to the present invention, a new image generating apparatus, image generating method, entertainment system, and recording medium, relating to computer graphics processing, can be provided, for projecting dot-sequences randomly existing in three-dimensional space onto a hypothetical two-dimensional screen.

What is claimed is:

1. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen based on a spatial distribution state of said
dot-sequences in said three-dimensional space, given that said plurality of dot-sequences randomly exist in a domain within said three-dimensional space, and to generate an image of said dot-sequences on said two-dimensional screen based on said spatial distribution state of said dot-sequences on said two-dimensional screen.

2. An apparatus according to claim 1, wherein
said spatial distribution state of said dot-sequences on said two-dimensional screen is represented by a probability said spatial distribution state of said dot-sequences in said three-dimensional space is represented by a probability density function in said three-dimensional space.

3. An apparatus for projecting a plurality of dot-sequences existing in a three-dimensional space upon a hypothetical two-dimensional screen, said apparatus comprising a graphics data generating processor to
   determine a spatial distribution state of said dot-sequences on said two-dimensional screen based on a spatial distribution state of said dot-sequences in said three-dimensional space, assuming that said plurality of dot-sequences randomly exist in a domain within said three-dimensional space;
   determine a point of view within said three-dimensional space from which to provide a reference for projecting said dot-sequences onto said two-dimensional screen;
   determine a direction of view from said point of view toward said plurality of dot-sequences; and
   generate an image of said dot-sequences on said two-dimensional screen based on said spatial distribution state of said dot-sequences on said two-dimensional screen.

4. An apparatus according to claim 3, wherein said distribution state of said dot-sequences on said two-dimensional screen is a probability density function g(x, y) expressed as follows:

$$g(x, y) = \int_0^\infty f(X, Y, Z) \cdot (Z/h)^2 \, dZ,$$

wherein
   said three-dimensional space is defined by x, y, and z coordinate axes;
   said direction of view from said point of view toward said plurality of dot-sequences is the z axis;
   said two-dimensional screen is oriented along the x and y axes;
   a probability density function for said plurality of dot-sequences existing within said three-dimensional space is f(X, Y, Z);
   a distance from said point of view to said two-dimensional screen is h; and
   a distance from said point of view to said dot-sequences existing within said three-dimensional space is Z.

5. An apparatus according to claim 3, wherein said distribution state of said dot-sequences on said two-dimensional screen is a probability density function g(x, y) expressed as follows:

$$g(x, y) = \int_0^\infty f(x \cdot Z/h, y \cdot Z/h, Z) \cdot (Z/h)^2 \, dZ,$$

wherein
   said three-dimensional space is defined by x, y, and z coordinate axes;
   said direction of view from said point of view toward said plurality of dot-sequences is the z axis;
   said two-dimensional screen is oriented along the x and y axes;
   a probability density function for said plurality of dot-sequences existing within said three-dimensional space is f(X, Y, Z);

a distance from said point of view to said two-dimensional screen is h; and a distance from said point of view to said dot-sequences existing within said three-dimensional space is Z.

6. An apparatus according to claim 3, wherein said plurality of dot-sequences existing within said three-dimensional space are apex coordinates of polygons which are used to draw image objects.

7. An apparatus according to claim 3, wherein said plurality of dot-sequences existing within said three-dimensional space are coordinates for drawing at least one object from the group consisting of clouds, a water surface, and tree leaves.

8. An apparatus according to claim 3, wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

9. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen using uniform random numbers, given that said plurality of dot-sequences randomly exist in a domain within said three-dimensional space, and to generate an image of said dot-sequences on said two-dimensional screen based on said spatial distribution state of said dot-sequences on said two-dimensional screen.

10. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen based on a one-dimensional Gaussian distribution generated from uniform random numbers using the Box-Muller method, given that said plurality of dot-sequences randomly exist in a domain within said three-dimensional space, and to generate an image of said dot-sequences on said two-dimensional screen based on said spatial distribution state of said dot-sequences on said two-dimensional screen.

11. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen using a two-dimensional Gaussian distribution, given that said plurality of dot-sequences randomly exist in a domain within said three-dimensional space, and to generate an image of said dot-sequences on said two-dimensional screen based on said spatial distribution state of said dot-sequences on said two-dimensional screen.

12. An apparatus according to claim 11, wherein said distribution state of said dot-sequences on said two-dimensional screen is a probability density function g(x, y) expressed as follows:

$$g(x,y)=(1/2\pi)\exp\{-x^2+y^2)/2\},$$

wherein said three-dimensional space is defined by x, y, and z coordinate axes; and said two-dimensional screen is oriented along the x and y axes.

13. A method for projecting a plurality of dot-sequences existing in a three-dimensional space upon a hypothetical two-dimensional screen, said method comprising:

determining a spatial distribution state of said dot-sequences in said three-dimensional space, given that said plurality of dot-sequences randomly exist in a domain within said three-dimensional space;

determining a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

14. A method according to claim 13 wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

15. A method for projecting a plurality of dot-sequences existing in a three-dimensional space upon a hypothetical two-dimensional screen, said method comprising:

determining a spatial distribution state of said dot-sequences in said three-dimensional space, given that said plurality of dot-sequences randomly exist in a domain within said three-dimensional space;

determine a point of view within said three-dimensional space from which to provide a reference for projecting said dot-sequences onto said two-dimensional screen;

determining a direction of view from said point of view toward said plurality of dot-sequences;

determining a spatial distribution state of said dot-sequences on said two-dimensional screen based on said spatial distribution state of said dot-sequences, in said three-dimensional space, said point of view, and said direction of view; and generating an image of said dot-sequences on said two-dimensional screen based on said spatial distribution state of said dot-sequences on said two-dimensional screen.

16. A method according to claim 15, wherein said distribution state of said dot-sequences on said two-dimensional screen is a probability density function g(x, y) expressed as follows:

$$g(x, y) = \int_0^\infty f(X, Y, Z) \cdot (Z/h)^2 \, dZ,$$

wherein said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is f(X, Y, Z);

a distance from said point of view to said two-dimensional screen is h; and a distance from said point of view to said dot-sequences existing within said three-dimensional space is Z.

17. A method according to claim 15, wherein said distribution state of said dot-sequences on said two-dimensional screen is a probability density function g(x, y) expressed as follows:

$$g(x, y) = \int_0^\infty f(x \cdot Z/h, y \cdot Z/h, Z) \cdot (Z/h)^2 dZ,$$

wherein
said three-dimensional space is defined by x, y, and z coordinate axes;
said direction of view from said point of view toward said plurality of dot-sequences is the z axis;
said two-dimensional screen is oriented along the x and y axes;
a probability density function for said plurality of dot-sequences existing within said three-dimensional space is f(X, Y, Z);
a distance from said point of view to said two-dimensional screen is h; and
a distance from said point of view to said dot-sequences existing within said three-dimensional space is Z.

18. A method according to claim 15, wherein said plurality of dot-sequences existing within said three-dimensional space are apex coordinates of polygons which are used to draw image objects.

19. A method according to claim 16, wherein said plurality of dot-sequences existing within said three-dimensional space are coordinates for drawing at least one object selected from the group consisting of clouds, a water surface, and tree leaves.

20. A method according to claim 15 wherein
said spatial distribution state of said dot-sequences on said two-dimensional screen is represented by a probability density function on said two-dimensional screen, and
said spatial distribution state of said dot-sequences in said three-dimensional space is represented by a probability density function in said three-dimensional space.

21. A method for projecting a plurality of dot-sequences existing in a three-dimensional space upon a hypothetical two-dimensional screen, given that said plurality of dot-sequences randomly exist in a domain within said three-dimensional space, said method comprising:
determining a spatial distribution state of said dot-sequences on said two-dimensional screen using uniform random numbers; and
generating an image of said dot-sequences on said two-dimensional screen based on said spatial distribution state of said dot-sequences on said two-dimensional screen.

22. A method for projecting a plurality of dot-sequences existing in a three-dimensional space upon a hypothetical two-dimensional screen, given that said plurality of dot-sequences randomly exist in a domain within said three-dimensional space, said method comprising:
determining a spatial distribution state of said dot-sequences on said two-dimensional screen based on a one-dimensional Gaussian distribution generated from uniform random numbers using the Box-Muller method; and
generating an image of said dot-sequences on said two-dimensional screen based on said spatial distribution state of said dot-sequences on said two-dimensional screen.

23. A method for projecting a plurality of dot-sequences existing in a three-dimensional space upon a hypothetical two-dimensional screen, given that said plurality of dot-sequences randomly exist in a domain within said three-dimensional space, said method comprising:
determining a spatial distribution state of said dot-sequences on said two-dimensional screen using a two-dimensional Gaussian distribution; and
generating an image of said dot-sequences on said two-dimensional screen based on said spatial distribution state of said dot-sequences on said two-dimensional screen.

24. A method according to claim 23, wherein said distribution state of said dot-sequences on said two-dimensional screen is a probability density function g(x, y) expressed as follows:

$$g(x,y)=(1/2\pi)\exp\{-(x^2+y^2)/2\},$$

wherein
said three-dimensional space is defined by x, y, and z coordinate axes; and
said two-dimensional screen is oriented along the x and y axes.

25. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to determine a spatial distribution state of said dot-sequences on a two-dimensional screen based on a spatial distribution state of said dot-sequences in said three-dimensional space, and to generate an image of said dot-sequences on said two-dimensional screen according to said spatial distribution state of said dot-sequences on said two-dimensional screen.

26. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to: determine a spatial distribution state of said dot-sequences on a two-dimensional screen based on a spatial distribution state of said dot-sequences in said three-dimensional space, a point of view within said three-dimensional space from which to provide a reference for projecting said dot-sequences onto said two-dimensional screen, and a direction of view from said point of view toward said plurality of dot-sequences; and to generate an image of said dot-sequences on said two-dimensional screen according to said spatial distribution state of said dot-sequences on said two-dimensional screen.

27. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to determine a spatial distribution state of said dot-sequences on a two-dimensional screen using a two-dimensional Gaussian distribution, and to generate an image of said dot-sequences on said two-dimensional screen according to said spatial distribution state of said dot-sequences on said two-dimensional screen.

28. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences in said three-dimensional space, given that said plurality of dot-sequences randomly exist in a domain within said three-dimensional space;

determining a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

29. A storage medium according to claim 28, wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

30. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences in said three-dimensional space, given that said plurality of dot-sequences randomly exist in a domain within said three-dimensional space;

determining a point of view within said three-dimensional space from which to provide a reference for projecting said dot-sequences onto said two-dimensional screen;

determining a direction of view from said point of view toward said plurality of dot-sequences;

determining a spatial distribution state of said dot-sequences on said two-dimensional screen based on said spatial distribution state of said dot-sequences in said three-dimensional space, said point of view, and said direction of view; and generating an image of said dot-sequences on said two-dimensional screen based on said spatial distribution state of said dot-sequences on said two-dimensional screen.

31. A storage medium according to claim 25, wherein said distribution state of said dot-sequences on said two-dimensional screen is a probability density function g(x, y) expressed as follows:

$$g(x, y) = \int_0^\infty f(X, Y, Z) \cdot (Z/h)^2 \, dZ,$$

wherein
said three-dimensional space is defined by x, y, and z coordinate axes;
said direction of view from said point of view toward said plurality of dot-sequences is the z axis;
said two-dimensional screen is oriented along the x and y axes;
a probability density function for said plurality of dot-sequences existing within said three-dimensional space is f(X, Y, Z);
a distance from said point of view to said two-dimensional screen is h; and
a distance from said point of view to said dot-sequences existing within said three-dimensional space is Z.

32. A storage medium according to claim 30, wherein said distribution state of said dot-sequences on said two-dimensional screen is a probability density function g(x, y) expressed as follows:

$$g(x, y) = \int_0^\infty f(x \cdot Z/h, y \cdot Z/h, Z) \cdot (Z/h)^2 \, dZ,$$

wherein
said three-dimensional space is defined by x, y, and z coordinate axes;
said direction of view from said point of view toward said plurality of dot-sequences is the z axis;
said two-dimensional screen is oriented along the x and y axes;
a probability density function for said plurality of dot-sequences existing within said three-dimensional space is f(X, Y, Z);
a distance from said point of view to said two-dimensional screen is h; and
a distance from said point of view to said dot-sequences existing within said three-dimensional space is Z.

33. A storage medium according to claim 30, wherein said plurality of dot-sequences existing within said three-dimensional space are apex coordinates of polygons which are used to draw image objects.

34. A storage medium according to claim 30, wherein said plurality of dot-sequences existing within said three-dimensional space are coordinates for drawing at least one object selected from the group consisting of clouds, a water surface, and tree leaves.

35. A storage medium according to claim 30, wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

36. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen using uniform random numbers, given that said plurality of dot-sequences randomly exist in a domain within said three-dimensional space; and generating an image of said dot-sequences on said two-dimensional screen based on said spatial distribution state of said dot-sequences on said two-dimensional screen.

37. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen based on a one-dimensional Gaussian distribution generated from uniform random numbers using the Box-Muller method, given that said plurality of dot-sequences randomly exist in a domain within said three-dimensional space; and generating an image of said dot-sequences on said two-dimensional screen based on said spatial distribution state of said dot-sequences on said two-dimensional screen.

38. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen using a two-dimensional Gaussian distribution, given that said plurality of dot-sequences randomly exist in a domain within said three-dimensional space; and generating an image of said dot-sequences on said two-dimensional screen based on said spatial distribution state of said dot-sequences on said two-dimensional screen.

39. A storage medium according to claim 38, wherein said distribution state of said dot-sequences on said two-dimensional screen is a probability density function g(x, y) expressed as follows:

$$g(x,y)=(1/2\pi)\exp\{-(x^2+y^2)/2\},$$

wherein said three-dimensional space is defined x, y, and z coordinate axes; and said two-dimensional screen is oriented along the x and y axes.

40. An apparatus for projecting a plurality of dot-sequences existing in a three-dimensional space upon a hypothetical two-dimensional screen, said apparatus comprising:

a graphics data processor operable to (i) obtain a mathematical expression of a spatial distribution state of said dot-sequences in said three-dimensional space, given that said plurality of dot-sequences randomly exist in a domain within said three-dimensional space, and (ii) determine a mathematical expression of a spatial distribution state of said dot-sequences on said two-dimensional screen based on said spatial distribution state of said plurality of dot-sequences in said three-dimensional space; and a rendering processor operable to generate an image of said dot-sequences on said two-dimensional screen based on said mathematical expression of said spatial distribution state of said dot-sequences on said two-dimensional screen.

41. An apparatus according to claim 40, wherein:

said graphics data processor is further operable to (i) determine a point of view within said three-dimensional space from which to provide a reference for projecting said dot-sequences onto said two-dimensional screen, (ii) determine a direction of view from said point of view toward said plurality of dot-sequences; and said rendering processor is further operable to generate said image of said dot-sequences on said two-dimensional screen based on said mathematical expression of said spatial distribution state of said dot-sequences on said two-dimensional screen.

42. An apparatus according to claim 40, wherein said mathematical expression of said spatial distribution state of said dot-sequences on said two-dimensional screen is determined using uniform random numbers.

43. An apparatus according to claim 40, wherein said mathematical expression of said spatial distribution state of said dot-sequences on said two-dimensional screen is determined using a one-dimensional Gaussian distribution generated from uniform random numbers using the Box-Muller method.

44. An apparatus according to claim 40, wherein said mathematical expression of said spatial distribution state of said dot-sequences on said two-dimensional screen is determined using a two-dimensional Gaussian distribution.

45. An apparatus according to claim 40, wherein:

said mathematical expression of said spatial distribution state of said dot-sequences in said three-dimensional space is a probability density function in said three-dimensional space; and said mathematical expression of said spatial distribution state of said dot-sequences on said two-dimensional screen is a probability density function on said two-dimensional screen.

46. A method for projecting a plurality of dot-sequences existing in a three-dimensional space upon a hypothetical two-dimensional screen, said method comprising:

obtaining a mathematical expression of a spatial distribution state of said dot-sequences in said three-dimensional space, given that said plurality of dot-sequences randomly exist in a domain within said three-dimensional space;

determining a mathematical expression of a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

47. A method according to claim 46, further comprising:

determining a point of view within said three-dimensional space from which to provide a reference for projecting said dot-sequences onto said two-dimensional screen;

determining a direction of view from said point of view toward said plurality of dot-sequences; and generating said image of said dot-sequences on said two-dimensional screen based on said mathematical expression of said spatial distribution state of said dot-sequences on said two-dimensional screen.

48. A method according to claim 46, wherein said mathematical expression of said spatial distribution state of said dot-sequences on said two-dimensional screen is determined using uniform random numbers.

49. A method according to claim 46, wherein said mathematical expression of said spatial distribution state of said dot-sequences on said two-dimensional screen is determined using a one-dimensional Gaussian distribution generated from uniform random numbers using the Box-Muller method.

50. A method according to claim 46, wherein said mathematical expression of said spatial distribution state of said dot-sequences on said two-dimensional screen is determined using a two-dimensional Gaussian distribution.

51. A method according to claim 46, wherein:

said mathematical expression of said spatial distribution state of said dot-sequences in said three-dimensional space is a probability density function in said three-dimensional space; and said mathematical expression of said spatial distribution state of said dot-sequences on said two-dimensional screen is a probability density function on said two-dimensional screen.

52. A storage medium containing a program operable to cause a processor to perform actions for projecting a plurality of dot-sequences existing in a three-dimensional space upon a hypothetical two-dimensional screen, said actions comprising:

obtaining a mathematical expression of a spatial distribution state of said dot-sequences in said three-dimensional space, given that said plurality of dot-sequences randomly exist in a domain within said three-dimensional space;

determining a mathematical expression of a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

53. A recording medium according to claim 52, further comprising:

determining a point of view within said three-dimensional space from which to provide a reference for projecting said dot-sequences onto said two-dimensional screen;

determining a direction of view from said point of view toward said plurality of dot-sequences; and generating said image of said dot-sequences on said two-dimensional screen based on said mathematical expression of said spatial distribution state of said dot-sequences on said two-dimensional screen.

54. A recording medium according to claim 52, wherein said mathematical expression of said spatial distribution state of said dot-sequences on said two-dimensional screen is determined using uniform random numbers.

55. A recording medium according to claim 52, wherein said mathematical expression of said spatial distribution state of said dot-sequences on said two-dimensional screen is determined using a one-dimensional Gaussian distribution generated from uniform random numbers using the Box-Muller method.

56. A recording medium according to claim 52, wherein said mathematical expression of said spatial distribution state of said dot-sequences on said two-dimensional screen is determined using a two-dimensional Gaussian distribution.

57. A recording medium according to claim 52, wherein:

said mathematical expression of said spatial distribution state of said dot-sequences in said three-dimensional space is a probability density function in said three-dimensional space; and said mathematical expression of said spatial distribution state of said dot-sequences on said two-dimensional screen is a probability density function on said two-dimensional screen.

58. An apparatus, comprising:

a graphics processor operable to (i) receive a model of an object in three-dimensional space including a plurality of randomly distributed groups of one or more polygons, (ii) determine a first mathematical expression that represents said random distribution of said groups of one or more polygons in said three-dimensional space, and (iii) determine a second mathematical expression that represents a distribution of said groups of one or more polygons in a two-dimensional space based on said first mathematical expression; and a rendering processor operable to render said groups of one or more polygons onto a two-dimensional plane of said two-dimensional space using said second mathematical expression.

59. An apparatus according to claim 58, wherein:

said graphics data processor is further operable to (i) determine a point of view within said three-dimensional space from which to provide a reference for projecting said polygons onto said two-dimensional screen, (ii) determine a direction of view from said point of view toward said polygons; and said rendering processor is further operable to generate said image of said polygons on said two-dimensional screen based on said second mathematical expression.

60. An apparatus according to claim 58, wherein said second mathematical expression is determined using uniform random numbers.

61. An apparatus according to claim 58, wherein said second mathematical expression is determined using a one-dimensional Gaussian distribution generated from uniform random numbers using the Box-Muller method.

62. An apparatus according to claim 58, wherein said second mathematical expression is determined using a two-dimensional Gaussian distribution.

63. An apparatus according to claim 58, wherein:

said first mathematical expression of said spatial distribution state of said polygons in said three-dimensional space is a probability density function in said three-dimensional space; and said second mathematical expression of said spatial distribution state of said polygons on said two-dimensional screen is a probability density function on said two-dimensional screen.

64. A method, comprising:

providing a model of an object in three-dimensional space including a plurality of randomly distributed groups of one or more polygons;

determining a first mathematical expression that represents said random distribution of said groups of one or more polygons in said three-dimensional space;

determining a second mathematical expression that represents a distribution of said groups of one or more polygons in a two-dimensional space based on said first mathematical expression; and rendering said groups of one or more polygons onto a two-dimensional plane of said two-dimensional space using said second mathematical expression.

65. A method according to claim 64, further comprising:

determining a point of view within said three-dimensional space from which to provide a reference for projecting said polygons onto said two-dimensional screen;

determining a direction of view from said point of view toward said plurality of polygons; and generating said image of said polygons on said two-dimensional screen based on said second mathematical expression.

66. A method according to claim 64, wherein said second mathematical expression is determined using uniform random numbers.

67. A method according to claim 64, wherein said second mathematical expression is determined using a one-dimensional Gaussian distribution generated from uniform random numbers using the Box-Muller method.

68. A method according to claim 64, wherein said second mathematical expression is determined using a two-dimensional Gaussian distribution.

69. A method according to claim 64, wherein:

said first mathematical expression of said spatial distribution state of said polygons in said three-dimensional space is a probability density function in said three-dimensional space; and said second mathematical expression of said spatial distribution state of said polygons on said two-dimensional screen is a probability density function on said two-dimensional screen.

70. A storage medium containing a program operable to cause a processor to perform actions, said actions comprising:

receiving a model of an object in three-dimensional space including a plurality of randomly distributed groups of one or more polygons;

determining a first mathematical expression that represents said random distribution of said groups of one or more polygons in said three-dimensional space;

determining a second mathematical expression that represents a distribution of said groups of one or more polygons in a two-dimensional space based on said first mathematical expression; and rendering said groups of one or more polygons onto a two-dimensional plane of said two-dimensional space using said second mathematical expression.

71. A storage medium according to claim 70, further comprising:

determining a point of view within said three-dimensional space from which to provide a reference for projecting said polygons onto said two-dimensional screen;

determining a direction of view from said point of view toward said plurality of polygons; and generating said image of said polygons on said two-dimensional screen based on said second mathematical expression.

72. A storage medium according to claim 70, wherein said second mathematical expression is determined using uniform random numbers.

73. A storage medium according to claim 70, wherein said second mathematical expression is determined using a one-dimensional Gaussian distribution generated from uniform random numbers using the Box-Muller method.

74. A storage medium according to claim 70, wherein said second mathematical expression is determined using a two-dimensional Gaussian distribution.

75. A storage medium according to claim 70, wherein:

said first mathematical expression of said spatial distribution state of said polygons in said three-dimensional space is a probability density function in said three-dimensional space; and said second mathematical expression of said spatial distribution state of said polygons on said two-dimensional screen is a probability density function on said two-dimensional screen.

* * * * *

(12) United States Patent  
Oka

(10) Patent No.: US 6,867,766 B1  
(45) Date of Patent: Mar. 15, 2005

(54) IMAGE GENERATING APPARATUS, IMAGE GENERATING METHOD, ENTERTAINMENT SYSTEM, AND RECORDING MEDIUM

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/577,736

(22) Filed: May 23, 2000

(30) Foreign Application Priority Data

May 25, 1999 (JP) .......................... P11-145686

(51) Int. Cl.$^7$ .............................................. G06T 15/00
(52) U.S. Cl. ...................................................... 345/419
(58) Field of Search .................... 345/419, 422, 473; 382/265, 216, 225, 228, 181

(56) References Cited

U.S. PATENT DOCUMENTS 5,063,351 A * 11/1991 Goldthorp et al. .......... 324/603

OTHER PUBLICATIONS

Lee, J., "Point Pattern Analysis With Density Estimation for Frequency Data", Proceedings of Geographic Information Systems, vol. 2, Nov. 14–16, 1995, pp. 598–607.

S.G. O'Brien, D. H. Tofsted, "Physics–based Visualization of Dense Natural Clouds. II. Cloud–rendering Algorithm", Applied Optics, vol. 37, No. 33, Nov. 20, 1998, pp. 7680–7688.

Miyata, K., "A Method of Generating Cloud Images Using Density Contour Lines", Transactions of the Institute of Electronics, Information and Communication Engineers, Tokyo, Japan, vol. E72, No. 6, Jun. 1, 1989, pp. 763–770.

Nishita, T. et al., "Display of Clouds Taking Into Account Multiple Anisotropic Scattering and Sky Light", Computer Graphics Proceedings, New York, New York, Aug. 4, 1996, pp. 379–386.

Bentley, Chris L.,"Animating Multidimensional Scaling to Visualize Large N–Dimensional Data Sets", 1996, pp.1–10.

* cited by examiner

Primary Examiner—Almis R. Jankus
(74) Attorney, Agent, or Firm—Lerner, David, Littenberg, Krumholz & Mentlik, LLP.

(57) ABSTRACT

An image generating apparatus and image generating method determine the distribution state of dot-sequences on a two-dimensional screen using two-dimensional Gaussian distribution in the event that the plurality of dot-sequences randomly exist in a sphere within the three-dimensional space, an generate an image of dot-sequences on the two-dimensional screen based on the distribution state on the two-dimensional screen. The two-dimensional Gaussian distribution can be factored to the product of one-dimensional Gaussian distributions, and the one-dimensional Gaussian distributions can be generated by uniform random numbers. Thus, it is easy to create an image by projecting a plurality of dot-sequences randomly existing in a three-dimensional space onto a two-dimensional screen.

75 Claims, 8 Drawing Sheets

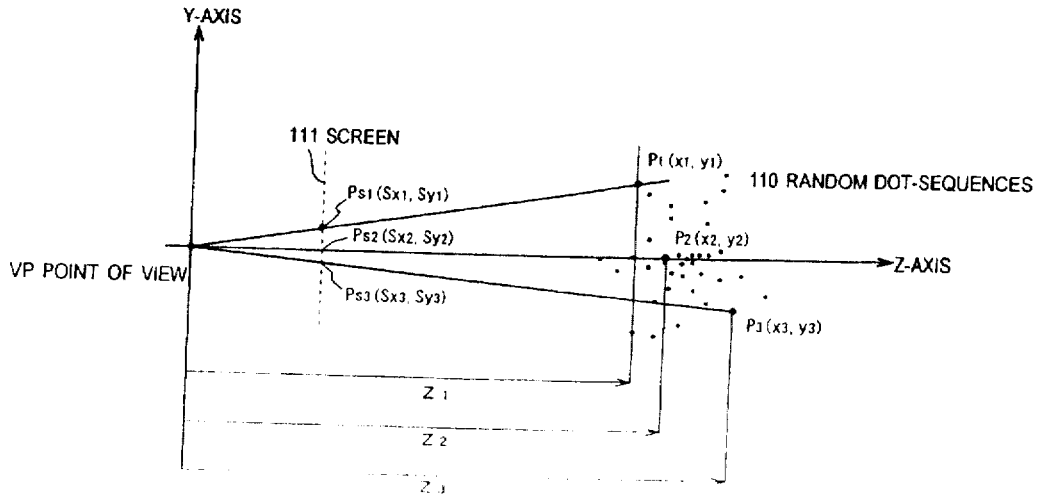

IMAGE GENERATING APPARATUS, IMAGE GENERATING METHOD, ENTERTAINMENT SYSTEM, AND RECORDING MEDIUM

BACKGROUND OF THE INVENTION

The present invention relates to an image generating method, image generating apparatus, entertainment system, and recording medium, applicable to generating and displaying three-dimensional object images in real-time using limited hardware resources, such as an entertainment system, a video game apparatus or a personal computer.

More specifically, the present invention relates to three-dimensional computer graphics processing, and relates to an image generating apparatus, image generating method, entertainment system, and recording medium, for displaying dot-sequences (groups of dots) on a two-dimensional screen, following probability distribution in a three-dimensional space.

In computer graphics processing, there are cases wherein a plurality of randomly-existing dots in three-dimensional space must be displayed on a two-dimensional hypothetical screen. Such multiple randomly-existing dots in three-dimensional space are used for example in cases of representing screen background clouds, waves on water, trees luxuriant with leaves, and so forth, with groups of extremely small dot groups. That is, such objects to be drawn are represented by groups of extremely small polygons (or primitives), so the apex coordinates of the polygon, the center point thereof, etc., can be understood as groups of dots (dot-sequences).

Conventionally, with computer graphics, there has been the need to calculate the coordinate values for each dot of dot-sequences existing in a three-dimensional space making up such clouds, waves, leaves, etc., and then display on a two-dimensional hypothetical screen.

Since the distance from the point of view to each of the extremely great number of points making up the object being drawn differs for each point, the number of calculations for coordinate conversion, perspective conversion, etc., is extremely great, resulting in a load on the CPU (Central Processing Unit) of the computer and other peripheral devices.

In other words, the number of calculations for such coordinate conversion, perspective conversion, etc., is extremely great when performing real-time high-speed drawing computation of object images which sequentially change on an entertainment system such as a video game apparatus, and this has been a problem.

SUMMARY OF THE INVENTION

Accordingly, the present invention has been made in light of the above problem, and it is an object thereof to provide a new image generating apparatus, image generating method, entertainment system, and recording medium, relating to computer graphics processing, for projecting dot-sequences randomly existing in three-dimensional space on a hypothetical two-dimensional screen.

According to a first aspect of the present invention, an image generating apparatus for projecting a plurality of dot-sequences existing in a three-dimensional space upon a hypothetical two-dimensional screen comprises means for determining the distribution state on the two-dimensional screen based on the distribution state of dot-sequences in the event that the plurality of dot-sequences randomly exist in a sphere within the three-dimensional space, so that an image of dot-sequences is generated on the two-dimensional screen based on the distribution state on the two-dimensional screen.

According to a second aspect of the present invention, an image generating apparatus for projecting a plurality of dot-sequences existing in a three-dimensional space upon a hypothetical two-dimensional screen comprises means for determining the distribution state on the two-dimensional screen based on the distribution state of dot-sequences, point of view, and direction of view, in the event that the plurality of dot-sequences randomly exist in a domain (for example, sphere) within the three-dimensional space, so that an image of dot-sequences is generated on the two-dimensional screen based on the distribution state on the two-dimensional screen.

With the above image generating apparatus, the probability density function g(x, y) which is the distribution state of dot-sequences on a two-dimensional screen may be determined by $$g(x, y) = \int_0^\infty f(X, Y, Z) \cdot (Z/h)^2 \, dZ$$

wherein the direction from the point of view toward the plurality of dot-sequences is stipulated as the Z-axis;
the two-dimensional screen is placed on the X-Y plane;
the probability density function for the plurality of dot-sequences existing within the three-dimensional space is f(X, Y, Z);
the distance from the point of view to the screen is represented by h; and
the distance from the point of view to the dot-sequences existing within the three-dimensional space is represented by Z.

Also, the probability density function g(x, y) which is the distribution state of dot-sequences on a two-dimensional screen may be determined by $$g(x, y) = \int_0^\infty f(x \cdot Z/h, y \cdot Z/h, Z) \cdot (Z/h)^2 \, dZ$$

wherein the direction from the point of view toward the plurality of dot-sequences is stipulated as the Z-axis;
the screen is placed on the X-Y plane;
the probability density function for the plurality of dot-sequences existing within the three-dimensional space is f(X, Y, Z);
the distance from the point of view to the screen is represented by h; and
the distance from the point of view to the dot-sequences existing within the three-dimensional space is represented by Z.

Such multiple dot-sequences existing within the three-dimensional space may be apex coordinates for drawing objects with polygons. The objects may be clouds, water surface, or tree leaves, for example, existing within the three-dimensional space.

According to a third aspect of the present invention, an image generating apparatus for projecting a plurality of dot-sequences existing in a three-dimensional space upon a hypothetical two-dimensional screen comprises means for determining the distribution state on the two-dimensional screen using uniform random numbers, in the event that the plurality of dot-sequences randomly exist in a sphere within the three-dimensional space, so that an image of dot-sequences is generated on the two-dimensional screen based on the distribution state on the two-dimensional screen.

According to a fourth aspect of the present invention, an image generating apparatus for projecting a plurality of dot-sequences existing in a three-dimensional space upon a hypothetical two-dimensional screen comprises means for determining the distribution state on the two-dimensional screen using two-dimensional Gaussian distribution, in the event that the plurality of dot-sequences randomly exist in a sphere within the three-dimensional space, so that an image of dot-sequences is generated on the two-dimensional screen based on the distribution state on the two-dimensional screen.

According to a fifth aspect of the present invention, an image generating method for projecting a plurality of dot-sequences existing in a three-dimensional space upon a hypothetical two-dimensional screen comprises the following steps:

determining distribution state of dot-sequences in the event that the plurality of dot-sequences randomly exist in a sphere within the three-dimensional space;

determining the distribution state on the two-dimensional screen, based on the distribution state of the plurality of dot-sequences in the three-dimensional space; and generating an image of dot-sequences on the two-dimensional screen, based on the distribution state on the two-dimensional screen thus determined.

According to a sixth aspect of the present invention, an image generating method for projecting a plurality of dot-sequences existing in a three-dimensional space upon a hypothetical two-dimensional screen comprises the following steps:

determining the distribution state of dot-sequences, point of view, and direction of view, in the event that the plurality of dot-sequences randomly exist in a sphere within the three-dimensional space;

determining the distribution state on the two-dimensional screen, based on the determined distribution state, point of view, and direction of view; and generating an image of dot-sequences on the two-dimensional screen, based on the distribution state on the two-dimensional screen thus determined.

According to a seventh aspect of the present invention, an image generating method for projecting a plurality of dot-sequences existing in a three-dimensional space upon a hypothetical two-dimensional screen comprises the following steps in the event that the plurality of dot-sequences randomly exist in a sphere within the three-dimensional space:

determining the distribution state on the two-dimensional screen, using uniform random numbers; and generating an image of dot-sequences on the two-dimensional screen, based on the determined distribution state on the two-dimensional screen.

According to an eighth aspect of the present invention, an image generating method for projecting a plurality of dot-sequences existing in a three-dimensional space upon a hypothetical two-dimensional screen comprises the following steps in the event that the plurality of dot-sequences randomly exist in a sphere within the three-dimensional space:

determining the distribution state on the two-dimensional screen, using two-dimensional Gaussian distribution; and generating an image of dot-sequences on the two-dimensional screen, based on the determined distribution state on the two-dimensional screen.

Such an image generating apparatus or image generating method may be employed in an entertainment system comprising at least a control system, a graphics system, a sound system, and an optical disk control unit.

Also, such a image generating method may be employed as a recording medium upon which has been recorded these steps.

With the present invention, the distribution density (probability density function) of dot-sequences on a two-dimensional screen regarding dot-sequences randomly existing in a three-dimensional space can be obtained based on the distribution density (probability density function), point of view, and direction of view of the dot-sequences in the three-dimensional space, without performing coordinate conversion, perspective conversion, etc., for each individual point.

Further, with the present invention, the distribution of dot-sequences on a two-dimensional screen regarding dot-sequences randomly existing in a three-dimensional space can be obtained by using two-dimensional Gaussian distribution without performing coordinate conversion, perspective conversion, etc., for each individual point, by means of employing an appropriate rule of approximation. This two-dimensional Gaussian distribution can be represented as the product of one-dimensional Gaussian distributions. Further, one-dimensional Gaussian distributions can be easily generated using uniform random numbers.

Accordingly, the load on the CPU, GTE, and other computing means is lightened, and high-speed graphic processing can be realized.

BRIEF DESCRIPTION OF THE DRAWINGS

FIG. 1 is a diagram illustrating the exterior view of a video game apparatus as an example of an entertainment system for carrying out the present invention;

FIG. 2 is a diagram illustrating the front of the video game apparatus shown in FIG. 1;

FIG. 3 is a diagram illustrating the video game apparatus shown in FIG. 1 with a portable electronic device inserted;

FIG. 4 is a diagram illustrating an example of a schematic circuit configuration of the principal portions of the video game apparatus shown in FIG. 1;

FIG. 5 is a diagram describing the manner in which multiple randomly-existing dots (dot-sequence) in three-dimensional space are projected on a two-dimensional screen;

FIG. 6 is a diagram describing an example of perspective conversion wherein randomly-existing dot-sequences in three-dimensional space in the current state are projected on a two-dimensional screen;

FIG. 7 is a diagram illustrating the state of dot-sequence distribution of randomly-existing dot-sequences in three-dimensional space having been projected on a two-dimensional screen; and FIG. 8 is a diagram describing the relation between the distribution of dot-sequences in three-dimensional space and the distribution of dot-sequences on the two-dimensional screen.

DESCRIPTION OF THE PREFERRED EMBODIMENTS

The following is a detailed description of the embodiments according to the present invention, with reference to the attached drawings.

First, an example of an entertainment system capable of carrying out the three-dimensional graphics according to the present invention will be briefly described with reference to the drawings.

FIG. 1 is a diagram illustrating the exterior view of a video game apparatus as an example of an entertainment system. This video game apparatus 1 is for reading out a game program recorded in an optical disk for example, and executing the game based on instructions from a user (game player). Incidentally, the term "executing the game" primarily refers to controlling progression, display, and audio of the game.

The main unit 2 of the video game apparatus 1 is configured having at the center thereof a disk mounting unit 3 where an optical disk, such as a CD-ROM, which is the recording medium for supplying application programs such as video games and the like, is mounted. The main unit 2 also includes a reset switch 4 for arbitrarily resetting the game, an electric power source switch 5, a disk operating switch 6 for operating the mounting of the optical disk, and two slots portions 7A and 7B, for example.

Two operating devices 20 can be connected to the slot portions 7A and 7B, so that two users can compete. Also, memory card devices which can be used to save (store) and read out game data, and portable electronic devices which can be detached from the main unit and execute the game, can be inserted into these slot portions 7A and 7B.

The operating device 20 has first and second operating units 21 and 22, a left button 23L, a right button 23R, a start button 24, and a selecting button 25, and further has operating units 31 and 32 which are capable of analog operation, a mode selection switch 33 for selecting the operating mode for these operating units 31 and 32, and a display unit 34 for displaying the selected operating mode.

FIG. 2 illustrates the slot portions 7A and 7B provided to the front of the main unit 2 of the video game apparatus 1. The slot portions 7A and 7B are each formed in two tiers, having memory card insertion portions 8A and 8B, respectively, into which memory cards 10 or portable electronic devices 100 are mounted, formed in the upper tier thereof. The slot portions 7A and 7B have controller connection portions (jacks) 9A and 9B, respectively, into which the connecting terminal portion (connector) 26 of the connector 20 is connected, formed in the lower tier thereof.

The insertion holes (slots) of the memory card insertion portions 8A and 8B are formed somewhat asymmetrically, so there is no erroneous insertion of memory cards. The controller connection portions 9A and 9B are formed somewhat asymmetrically, so there is no erroneous insertion of connecting terminal portions 26 of the controllers 20, and also formed so as to have a insertion hole shape differing from that of the memory card insertion portions 8A and 8B, so there is no erroneous insertion of memory cards.

FIG. 3 illustrates a state wherein a portable electronic device 100 has been inserted into the memory card insertion portion 8A of the slot portion 7A at the front of the video game apparatus 1.

Next, FIG. 4 is a block diagram illustrating an example of a schematic circuit configuration of the principal portions of the video game apparatus 1.

This video game apparatus 1 is made up of, among other things, a control system 50 comprising a CPU (Central Processing Unit) 51 and devices peripheral thereto and the like; a graphic system 60 comprising a GPU (Graphic Processing Unit) 62 for performing drawing to a frame buffer 63 and so forth; a sound system 70 comprising an SPU (Sound Processing Unit) and the like for generating music, sound effects, etc.; an optical disk control unit 80 for performing control of optical disks upon which are recorded application programs; a communication control unit 90 for controlling signals from the controllers 20 whereby instructions are input from the users, for controlling input and output of data from and to memory cards 10 for storing game settings and the like, and for controlling input and output of data from and to later-described portable electronic devices 100; and a bus BUS to which the above components are connected.

The control system 50 is provided with a CPU 51, a peripheral device control unit 52 for performing interruption control, control of DMA (Dynamic Memory Access), etc., main memory (main storage device) 53 made up of RAM (Random Access Memory), and ROM (Read-Only Memory) 54 storing programs such as the so-called operating system which manages the main memory 53, graphic system 60, sound system 70, and so forth. The term main memory 53 here refers to such memories whereby programs can be executed thereupon.

The CPU 51 is for controlling the entire video game apparatus 1 by executing the operating system stored in the ROM 54, and is made up of a 32-bit RISC (Reduced-Instruction Set Computer) CPU, for example.

Once the power is turned on to this video game apparatus 1, the CPU 51 of the control system 50 controls the graphic system 60, sound system 70, etc., by executing the operating system stored in the ROM 54.

Also, once the operating system is executed, the CPU 51 performs initialization of the entire video game apparatus 1, such as checking operation and so forth, following which the CPU 51 controls the optical disc control unit 80 to execute application programs, such as a game stored in the optical disk. By means of executing the programs, such as games, the CPU 51 controls the graphic system 60, sound system 70, etc., according to input from the user, to control image display and generation of sound effects and music.

Also, the graphics system 60 is provided with a graphics data generating processor or a GTE (Geometry Transfer Engine) 61 for performing processing, such as coordinate conversion and the like; a GPU (Graphic Processing Unit) 62 for performing drawing by following the drawing instructions from the CPU 51; a frame buffer 63 for storing image drawn by this GPU 62; and an image decoder 64 for decoding image data compressed and encoded by orthogonal transformation, such as discrete cosine transformation and the like.

The GTE 61 functions as a co-processor of the CPU 51. The GTE 61 has a parallel computer mechanism for executing multiple computations in parallel for example, so as to be able to perform high-speed computation, such as coordinate conversion, light source calculation, matrix or vector computation, etc., according to computation requests from the CPU 51. That is, calculation of the apex coordinates of polygons relating to the present invention are carried out in the GTE 61. This GTE 61 is designed such that, in the case of performing computation for flat shading wherein a single triangular polygon is drawn in a single color, the GTE 61 is capable of performing coordinate computation for up to around 1,500,000 polygons per second, and accordingly, this video game apparatus reduces the load on the CPU 51, and realizes high-speed coordinate computation.

Also, the GPU 62 operates by following polygon drawing commands from the CPU 51. The GPU 62 has a two-dimensional address space independent from the CPU 51, and performs drawing of polygons and the like to the frame buffer 63 which is this address space. This GPU 62 is designed to be able to draw up to around 630,000 polygons per second.

Further, the frame buffer 63 is made up of a so-called dual port RAM, and is capable of simultaneously performing drawing from the GPU 62 or transfer from the main memory 53, and reading for display. This frame buffer 63 has a capacity of 1 megabyte, for example, which is handled as a matrix of 1024 horizontal pixels by 512 vertical pixels, each pixel being 16 bits.

Also provided in this frame buffer 63, besides the display area output as video output, is a CLUT (Color Look-Up Table) area for storing a CLUT to which the GPU 62 makes reference at the time of drawing polygons and the like, and a texture area for storing textures which are inserted onto the polygons and the like, which are subjected to coordinate conversion at the time of drawing, and drawn by the GPU 62 (i.e., mapped). The CLUT area and texture area are dynamically updated according to changes in the display area and so forth.

Also, the GPU 62 is designed so as to be able to perform, in addition to flat shading, Gouraud shading wherein the color within a polygon is determined by interpolating the color of the apexes of the polygon, and texture mapping wherein textures stored in the texture area are pasted onto the polygon. In the event of performing such Gouraud shading or texture mapping, the GTE 16 is capable of performing coordinate calculations for up to around 500,000 polygons per second.

Further, the image decoder 64 decodes still or motion image data stored in the main memory 53 based on control from the CPU 51 and stores this in the main memory 53.

Also, this regenerated image data is stored in the frame buffer 63 via the GPU 62, thus enabling it to be used for image backgrounds drawn by the GPU 62.

The sound system 70 is provided with an SPU 71 which generates music, sound effects, etc., based on instructions from the CPU 51; a sound buffer 72 wherein waveform data and the like is stored by the SPU 71; and a speaker 73 for outputting the music, sound effects, etc., generated by the SPU 71.

The SPU 71 is provided with, among others, ADPCM decoding functions for playing sound data subjected to ADPCM (Adaptive Differential PCM) encoding by taking 16-bit audio data as 4-bit differential signals, for example; playing functions for generating sound effects and the like by playing the waveform data stored in the sound buffer 72; and modulating functions for modulating and playing the waveform data stored in the sound buffer 72.

Having such functions allows the sound system 70 to be used as a so-called sampling sound source wherein music, sound effects, etc., are generated based on the waveform data recorded in the sound buffer 72, based on instructions from the CPU 51.

The optical disk control unit 80 is provided with an optical disk device 81 for playing recorded programs and data and the like stored in the optical disk; a decoder 82 for decoding programs and data and the like to which are added ECC (Error Correction Code), for example; and a buffer 83 for realizing high-speed data reading from the optical disk by means of temporarily storing the data from the optical disk device 81. A sub-CPU 84 is connected to the decoder 82.

Also, in addition to the above ADPCM data for the audio data recorded in the optical disk to be read out with the optical disk device 81, there is so-called PCM data, which are audio signals subjected to analog/digital conversion.

The audio data recorded by representing 16-bit digital data as 4-bit differential signals, for example for ADPCM data, is decoded by the decoder 82, supplied to the above SPU 71, subjected to digital/analog conversion and the like by the SPU 71, and then used for driving the speaker 73.

Also, audio data recorded as 16-bit digital data, for example for PCM data, is decoded by the decoder 82, then used for driving the speaker 73.

Further, the communication control unit 90 has a communication control device 91 for performing control of communication with the CPU 51 via the bus BUS, with the controller connecting portion 12 to which controllers 20 for inputting instructions from the user are connected, and with the memory card insertion portions 8A and 8B to which memory cards 10 serving as auxiliary storing devices for storing game setting data and the like and the later-described portable electronic devices 100 are connected.

The controller 20 connected to the controller connecting portion 9 has 16 instructing keys, for example, for inputting instructions from the user, and makes transmission by synchronous communication to the communication control device 91 (around 60 times per second) regarding the state of the instruction keys according to instructions from the communication control device 91. The communication control device 91 then sends the instruction key state of the controller 20 to the CPU 51.

Thus, the instructions from the user are input to the CPU 51, and the CPU 51 performs processing according to the instructions from the user, based on the game program or the like which is being executed.

Regarding the main memory 53, GPU 62, image decoder 64, decoder 82, and so forth, there is the need to transfer large amounts of image data a high speeds at the time of reading the program, displaying images, drawing images, etc. Accordingly, this video game apparatus is designed so as to perform so-called DMA transfer wherein data transfer is performed directly between the main memory 53, GPU 62, image decoder 64, decoder 82, and so forth, under control of the peripheral device control unit 52, without going through the CPU 51. Thus, the load on the CPU 51 due to data transfer can be reduced, and high-speed data transfer can be performed.

Also, in the event that the CPU 51 needs to store game settings data and the like for the game being executed, the data to be stored is transferred to the communication control device 91, and the communication control device 91 writes the data from the CPU 51 to a memory card 10 or portable electronic device 100 inserted in the slot of a memory card insertion portion 8A or 8B.

The communication control device 91 has a built in protective circuit for preventing electrical destruction. The memory card 10 and portable electronic device 100 are separated from the bus BUS, and can be mounted or detached with the electric power turned on to the main unit. Accordingly, a new memory card can be inserted without turning off electric power to the main unit, in the event that the storage capacity of the memory card 10 or portable electronic device 100 is found to be insufficient, or in other like cases. Consequently, a new memory card can be inserted and the necessary data can be written to the new memory card, without losing any of the game data which needs to be backed up.

Also, the parallel I/O interface (PIO) 96 and serial I/O interface (SIO) 97 are interfaces for connecting the memory card 10 or portable electronic device 100 to the video game apparatus 1

With the above-described entertainment system, high-speed computation using approximation calculations at the time of performing the perception conversion may be achieved according to the present embodiment.

Three-dimensional graphics is an art relating to calculating how an object placed in three-dimensional space on a screen (assumed at a certain position) is perceived when viewing the object from a certain point of view.

The GTE 61 functions as a co-processor for performing high-speed geometry computation. Of such high-speed computations, a typical geometry computation is provided to the game programmer in the format of a library, for example. In the following description, the approximation calculation for perception conversion capable of obtaining the same results with a simple method at the time of conducting perception of dot-sequences randomly distributed in a three-dimensional space onto a two-dimensional screen can be prepared as a basic geometry library for example, and provided to game software programmers.

FIG. 5 is a diagram for describing the projection of the multiple dot-sequences 110 randomly existing in a three-dimensional space onto a two-dimensional screen 111 (e.g., a hypothetical or virtual screen). Here, the multiple dot-sequences 110 randomly distributed in three-dimensional space exist as the object of drawing. In order to display the object of three-dimensional drawing on a two-dimensional display device (television set, monitor, etc.), there is the need to make a three-dimensional representation on a hypothetical two-dimensional screen 111 beforehand. Accordingly, there is the need to project the three-dimensional dot-sequences 110 onto the hypothetical two-dimensional screen 111.

The point-of-view coordinate axes in the three-dimensional space surrounding the point of view VP areas follows: the direction from the point of view VP toward the random dot-sequences 110 is the Z-axis, the horizontal direction of the screen 111 is the X-axis, and the vertical direction of the screen 111 is the Y-axis.

FIG. 6 is a diagram illustrating an example of perspective conversion for projecting dot-sequences randomly existing in a three-dimensional space onto a hypothetical two-dimensional screen. Of the random dot-sequences 110, representative points P1, P2, and P3 will be described. The coordinates of the points P1, P2, and P3 are P1 (X1, Y1), P2 (X2, Y2), and P3 (X3, Y3), respectively. With the distance from the point of view VP to the points P1, P2, and P3 as Z1, Z2, and Z3, and the distance from the point of view VP to the screen as h, the coordinate values Ps1 (Sx1, Sy1), Ps2 (Sx2, Sy2), and Ps3 (Sx3, Sy3) of the points P1, P2, and P3 making up the random dot-sequence 110 on the screen 111 can be calculated triangles in a homothetic relation in accordance with the calculations below.

$$Sx1 = X1 \times (h/Z1), \; Sy1 = Y1 \times (h/Z1) \quad (1)$$

$$Sx2 = X2 \times (h/Z2), \; Sy2 = Y2 \times (h/Z2) \quad (2)$$

$$Sx3 = X3 \times (h/Z3), \; Sy3 = Y3 \times (h/Z3) \quad (3)$$

The reason for performing these calculations is as follows. The distance from the point of view VP to the screen is a constant h, but the distance from the point of view VP to the three points P1, P2, and P3 are each different, i.e., Z1, Z2, and Z3, so the homothetic ratios also differ, i.e., (h/Z1), (h/Z2), and (h/Z3).

In the event that the dot-sequence randomly existing in the three-dimensional space is configured of N dots, the calculations of the expressions (1) through (3) must be repeated for the number of points, i.e., N times, in order to calculate the coordinates on the screen.

According to one aspect of the invention, it is assumed that the randomly distributed dot-sequences existing in the three-dimensional space are dot-sequences uniformly distributed within a sphere.

FIG. 7 is a diagram illustrating the results of randomly-existing dot-sequences in such a three-dimensional space having been projected on a two-dimensional screen in the direction of view (i.e., in the Z-axial direction).

In the event of projecting such dot-sequences on a two-dimensional screen, the overall distribution of the projected dot-sequences exists within a circle, with the distribution being denser (darker) at the center position, growing gradually sparser in the radial direction, and becoming the sparsest (lightest) around the perimeter.

Now, with the probability density function for the dot-sequences uniformly existing within the spherical three-dimensional space as f(X, Y, Z), the probability of emergence of dot-sequences can be represented with the following expression:

$$0 \leq f(X,Y,Z) \leq 1 \quad (4)$$

Performing volume integration of this probability density function f(X, Y, Z) over the entire three-dimensional space yields the total probability of emergence of dot-sequences as 1, giving the following expression:

$$\int f(X, Y, Z) dv = 1 \quad (5)$$

Next, the distribution probability of dots in the event of projecting a dot-sequence having the probability density function f(X, Y, Z) and existing in three-dimensional space onto a two dimensional screen will be studied. The probability density function of this dot-sequence on the two dimensional screen 111 is represented by g(X, Y).

First, the relation between the three-dimensional space and the two dimensional screen 111 is obtained. As shown in FIG. 8, the area of a square S existing in three-dimensional space projected onto the screen is a minute area dS on the screen. With the distance from the point of view VP to the minute area dS on the screen 111 as h, and the distance from the point of view VP to the square S in three-dimensional space as Z, the square S and the minute area dS are related in terms of the segment ratio (h/Z) squared, thus yielding the following relation.

$$S = dS \cdot (Z/h)^2 \quad (6)$$

The probability of a dot-sequence on the minute area dS on the screen is obtained by integrating the probability of the dot-sequence in the three-dimensional space from the point of view to infinity (0 to ∞) in the form of a pyramid with the base thereof being the square S, and thus can be represented as the following expression:

$$g(x,y) dS = \int_0^\infty f(X,Y,Z) \, S \, dZ$$

$$= \int_0^\infty f(X,Y,Z) (Z/h)^2 \, dS \, dZ \quad (7)$$

Expression (7) yields Expression (8):

$$g(x, y) = \int_0^\infty f(X, Y, Z) \cdot (Z/h)^2 \, dZ \tag{8}$$

Now, the following equation for perspective conversion holds between the coordinates (x, y) on the screen and the coordinates (X, Y) in the three-dimensional space:

$$x = X \cdot (h/Z) \tag{9}$$

$$y = Y \cdot (h/Z) \tag{10}$$

Substituting Expressions (9) and (10) into Expression (8) yields the following expression:

$$g(x, y) = \int_0^\infty f(x \cdot Z/h, y \cdot Z/h, Z) \cdot (Z/h)^2 \, dZ \tag{11}$$

Expression (11) can represent the dot-sequence distribution on the two-dimensional screen with the three-dimensional space coordinate values alone, and on the other hand, Expression (11) can represent this with the two-dimensional screen coordinates values alone.

Thus, according to Expression (11), once the probability density function f(X, Y, Z) in three-dimensional space, the point of view VP, and the direction of view (the Z-axial direction in this case) are determined, the probability density function g(x, y) on the two-dimensional screen can be determined.

Assuming that there is no need to display the front and back relationship between dots (i.e., the distance thereof in the Z direction) of the dot-sequence randomly existing in the three-dimensional space, the following statements may be made. That is, the conventional method of generating random dot-sequences within a three-dimensional space, and performing coordinate conversion and perspective conversion for each point, requires an extremely great number of calculations, which is a massive load on the CPU and GTE.

Instead of performing such calculations, generating dot-sequences having a probability density g(x,y) on the two-dimensional screen as described above yields the same results for the obtained dot-sequence distribution on the screen.

This is advantageous in that generating dot-sequences having a probability density g(x, y) on the two-dimensional screen does away with the necessity for the coordinates conversion and perspective conversion calculations for each point, and once the probability density function f(X, Y, Z), point of view VP, and direction of view are determined, dot-sequences can be generated beforehand. Accordingly, there is the advantage that the load on the processing devices for graphics in an entertainment system, such as the CPU and GTE, can be lightened.

The integration expression in Expression (11) can be numerically solved if f(X, Y, Z) is provided. However, under constant conditions, this can be solved in an even simpler manner, using a approximation expression.

Assuming that dot-sequences are uniformly distributed within a sphere in three-dimensional space, the probability density f(X, Y, Z) of the dot-sequence in the three-dimensional space can be represented with a constant A.

$$f(X, Y, Z) = A \tag{12}$$

Substituting Expression (12) into Expression (11) yields the following expression:

$$g(x, y) = \int_{Z_{in}}^{Z_{out}} A \cdot (Z/h)^2 \, dZ \tag{13}$$

Now, Zin and Zout are the point of entry and point of exit of the integration path passing through the surface of the sphere. In the event that the integration path does not pass through the surface of the sphere, Zin=Zout=0 holds.

Further, in the event that the surface of the sphere is sufficiently distant from the point of view (in the event that Z is great), the difference from the point of view to each point making up the dot-sequence (i.e., the amount of change of Z of the dot-sequence within the surface of the sphere) is extremely small in relative considerations, and thus can be viewed as a constant. On the other hand, the distance h from the point of view VP to the screen 111 is a constant. The homothetic ratio (Z/h) hardly changes, so (Z/h) can be viewed as a constant. Accordingly, with (Z/h)$^2$=B, the following expression can be obtained:

$$g(x, y) = \int_{Z_{in}}^{Z_{out}} A \cdot B \, dZ \tag{14}$$

Solving Expression (14) yields the following expression:

$$g(x, y) = A \cdot B (Z_{out} - Z_{in}) \tag{15}$$

According to Expression (15), the dot-sequence distribution on the two-dimensional screen is proportional to (Zout−Zin). This (Zout−Zin) represents to what degree the line of view has passed through the sphere. That is to say, in the event that the line of view has passed through the center portion of the sphere, (Zout−Zin) is a relatively large, value, but conversely, in the event that the line of view has near the surface of the sphere, (Zout−Zin) is a relatively small value.

As a result, the probability density function g(x,y) on the two-dimensional screen has a distribution of a great value at the center of a circle corresponding to the center of the sphere, and has a small value at the perimeter (outer side) of the circle corresponding to the perimeter of the sphere.

It can be understood that a distribution having such properties can be representatively approximated by two-dimensional Gaussian distribution. In this case, in order to simplify the expression, the variance of the two-dimensional Gaussian distribution to be approximated is made to be 1 (i.e., $\sigma^2 = 1$), and the average zero (i.e., ave. x=0).

Accordingly, Expression (11) can be represented as in the following expression:

$$g(x, y) = (1/2\pi) \exp\{-(x^2 + y^2)/2\} \tag{16}$$

Factoring the two-dimensional Gaussian distribution of Expression (16) yields a form of multiplied one-dimensional Gaussian distributions.

$$g(x, y) = (1/\sqrt{2\pi}) \exp(-x^2/2) \cdot (1/\sqrt{2\pi}) \exp(-y^2/2) \tag{17}$$

The random numbers following the one-dimensional Gaussian distribution can be generated from uniform random numbers using the Box-Muller method.

$$GR = \sqrt{-2 \log R1} \cdot \cos(2\pi R2) \tag{18}$$

Here, R1 and R2 represent uniform random numbers, and GR represents Gaussian distribution random numbers.

As a result, it can be understood that the distribution g(x, y) on the two-dimensional screen can be created using uniform random numbers.

Incidentally, in order to simplify the Gaussian distribution expression, the variance of the Gaussian distribution is made to be 1, and the average zero. This is under the assumption that the dot-sequences to be drawn exist in three-dimensional space within a constant sphere, and a great number of points are distributed uniformly. In the event that the dot-sequences to be drawn existing in three-dimensional space expand beyond the sphere, the distribution g(x, y) on the two-dimensional screen obtained under the assumption of the sphere containing most of the dot-sequences can be enlarged by an appropriate ratio in the x direction and y direction, according to the state of the three-dimensional space expanding beyond the sphere.

Thus, in the event of projecting dot-sequences uniformly distributed within a spherical surface onto a two-dimensional screen, the distribution of the dot-sequences on the two-dimensional screen can be obtained simply by using one-dimensional Gaussian distribution random numbers, without coordinate conversion and perspective conversion calculations for each point.

Incidentally, the above-described image generating method may be formed into a program, and provided as a recording medium readable and executable by an entertainment system. This program can be provided either in the state of being individually recorded on a recording medium such as an optical disk, or in the state of having been recorded as a part of game software. These programs are activated on the entertainment system 1, and executed by the CPU 51 thereof.

The meaning of the above-described image generating method being individually recorded as a program on a recording medium is in that the program is prepared beforehand as a library for software development. It is a known fact that creating all functions at the time of developing software requires tremendous amounts of time.

However, breaking down such massive software functions into types reveals that there are many functions common to various types of software, such as the function for moving an object.

Thus, functions capable of being shared as the above-described embodiment can be provided to software manufacturers as library programs. The software manufacturers then only need to create the essential portions of the software, since such commonly-used functions can be provided externally as programs.

According to the above-described embodiment, in computer graphics, dot-sequences distributed in three-dimensional space can be simply projected on a two-dimensional screen, without placing a load on the CPU, GTE, and other coordinates computing means. Objects of a drawing which randomly exist in three-dimensional space, such as clouds, water surface, and tree leaves, can thus be calculated using one-dimensional Gaussian distribution random numbers.

According to the present invention, a new image generating apparatus, image generating method, entertainment system, and recording medium, relating to computer graphics processing, can be provided, for projecting dot-sequences randomly existing in three-dimensional space onto a hypothetical two-dimensional screen.

What is claimed is:

1. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen based on a spatial distribution state of said dot-sequences in said three-dimensional space, given that said plurality of dot-sequences randomly exist in a domain within said three-dimensional space, and to generate an image of said dot-sequences on said two-dimensional screen based on said spatial distribution state of said dot-sequences on said two-dimensional screen.

2. An apparatus according to claim 1, wherein said spatial distribution state of said dot-sequences on said two-dimensional screen is represented by a probability said spatial distribution state of said dot-sequences in said three-dimensional space is represented by a probability density function in said three-dimensional space.

3. An apparatus for projecting a plurality of dot-sequences existing in a three-dimensional space upon a hypothetical two-dimensional screen, said apparatus comprising a graphics data generating processor to determine a spatial distribution state of said dot-sequences on said two-dimensional screen based on a spatial distribution state of said dot-sequences in said three-dimensional space, assuming that said plurality of dot-sequences randomly exist in a domain within said three-dimensional space;

determine a point of view within said three-dimensional space from which to provide a reference for projecting said dot-sequences onto said two-dimensional screen;

determine a direction of view from said point of view toward said plurality of dot-sequences; and generate an image of said dot-sequences on said two-dimensional screen based on said spatial distribution state of said dot-sequences on said two-dimensional screen.

4. An apparatus according to claim 3, wherein said distribution state of said dot-sequences on said two-dimensional screen is a probability density function g(x, y) expressed as follows:

$$g(x, y) = \int_0^\infty f(X, Y, Z) \cdot (Z/h)^2 \, dZ,$$

wherein said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is f(X, Y, Z);

a distance from said point of view to said two-dimensional screen is h; and a distance from said point of view to said dot-sequences existing within said three-dimensional space is Z.

5. An apparatus according to claim 3, wherein said distribution state of said dot-sequences on said two-dimensional screen is a probability density function g(x, y) expressed as follows:

$$g(x, y) = \int_{h}^{\infty} f(x \cdot Z/h, y \cdot Z/h, Z) \cdot (Z/h)^2 \, dZ.$$

wherein
  said three-dimensional space is defined by x, y, and z coordinate axes;
  said direction of view from said point of view toward said plurality of dot-sequences is the z axis;
  said two-dimensional screen is oriented along the x and y axes;
  a probability density function for said plurality of dot-sequences existing within said three-dimensional space is f(X, Y, Z);
  a distance from said point of view to said two-dimensional screen is h; and
  a distance from said point of view to said dot-sequences existing within said three-dimensional space is Z.

6. An apparatus according to claim 3, wherein said plurality of dot-sequences existing within said three-dimensional space are apex coordinates of polygons which are used to draw image objects.

7. An apparatus according to claim 3, wherein said plurality of dot-sequences existing within said three-dimensional space are coordinates for drawing at least one object from the group consisting of clouds, a water surface, and tree leaves.

8. An apparatus according to claim 3, wherein
  said spatial distribution state of said dot-sequences on said two-dimensional screen is represented by a probability density function on said two-dimensional screen, and
  said spatial distribution state of said dot-sequences in said three-dimensional space is represented by a probability density function in said three-dimensional space.

9. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen using uniform random numbers, given that said plurality of dot-sequences randomly exist in a domain within said three-dimensional space, and to generate an image of said dot-sequences on said two-dimensional screen based on said spatial distribution state of said dot-sequences on said two-dimensional screen.

10. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen based on a one-dimensional Gaussian distribution generated from uniform random numbers using the Box-Muller method, given that said plurality of dot-sequences randomly exist in a domain within said three-dimensional space, and to generate an image of said dot-sequences on said two-dimensional screen based on said spatial distribution state of said dot-sequences on said two-dimensional screen.

11. An apparatus for projecting a plurality of dot-sequences existing in a three-dimensional space upon a hypothetical two-dimensional screen, said apparatus comprising a graphics data generating processor operable to determine a spatial distribution state of said dot-sequences on said two-dimensional screen using a two-dimensional Gaussian distribution, given that said plurality of dot-sequences randomly exist in a domain within said three-dimensional space, and to generate an image of said dot-sequences on said two-dimensional screen based on said spatial distribution state of said dot-sequences on said two-dimensional screen.

12. An apparatus according to claim 11, wherein said distribution state of said dot-sequences on said two-dimensional screen is a probability density function g(x, y) expressed as follows:

$$g(x, y) = (1/2\pi)\exp\{-(x^2+y^2)/2\},$$

wherein
  said three-dimensional space is defined by x, y, and z coordinate axes; and
  said two-dimensional screen is oriented along the x and y axes.

13. A method for projecting a plurality of dot-sequences existing in a three-dimensional space upon a hypothetical two-dimensional screen, said method comprising:
  determining a spatial distribution state of said dot-sequences in said three-dimensional space, given that said plurality of dot-sequences randomly exist in a domain within said three-dimensional space;
  determining a spatial distribution state of said dot-sequences on said two-dimensional screen based on said spatial distribution state of said plurality of dot-sequences in said three-dimensional space; and
  generating an image of said dot-sequences on said two-dimensional screen based on said spatial distribution state of said dot-sequences on said two-dimensional screen.

14. A method according to claim 13 wherein
  said spatial distribution state of said dot-sequences on said two-dimensional screen is represented by a probability density function on said two-dimensional screen, and
  said spatial distribution state of said dot-sequences in said three-dimensional space is represented by a probability density function in said three-dimensional space.

15. A method for projecting a plurality of dot-sequences existing in a three-dimensional space upon a hypothetical two-dimensional screen, said method comprising:
  determining a spatial distribution state of said dot-sequences in said three-dimensional space, given that said plurality of dot-sequences randomly exist in a domain within said three-dimensional space;
  determine a point of view within said three-dimensional space from which to provide a reference for projecting said dot-sequences onto said two-dimensional screen;
  determining a direction of view from said point of view toward said plurality of dot-sequences;
  determining a spatial distribution state of said dot-sequences on said two-dimensional screen based on said spatial distribution state of said dot-sequences, in said three-dimensional space, said point of view, and said direction of view; and
  generating an image of said dot-sequences on said two-dimensional screen based on said spatial distribution state of said dot-sequences on said two-dimensional screen.

16. A method according to claim 15, wherein said distribution state of said dot-sequences on said two-dimensional screen is a probability density function g(x, y) expressed as follows:

$$g(x, y) = \int f(X, Y, Z)\, dZ/h\, dZ,$$

wherein
  said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is f(X, Y, Z);

a distance from said point of view to said two-dimensional screen is h; and a distance from said point of view to said dot-sequences existing within said three-dimensional space is Z.

17. A method according to claim 15, wherein said distribution state of said dot-sequences on said two-dimensional screen is a probability density function g(x, y) expressed as follows:

$$g(x, y) = \int_0^\infty f(x \cdot Z/h, y \cdot Z/h, Z) \cdot (Z/h)^2 \, dZ,$$

wherein said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is f(X, Y, Z);

a distance from said point of view to said two-dimensional screen is h; and a distance from said point of view to said dot-sequences existing within said three-dimensional space is Z.

18. A method according to claim 15, wherein said plurality of dot-sequences existing within said three-dimensional space are apex coordinates of polygons which are used to draw image objects.

19. A method according to claim 15, wherein said plurality of dot-sequences existing within said three-dimensional space are coordinates for drawing at least one object selected from the group consisting of clouds, a water surface, and tree leaves.

20. A method according to claim 15 wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

21. A method for projecting a plurality of dot-sequences existing in a three-dimensional space upon a hypothetical two-dimensional screen, given that said plurality of dot-sequences randomly exist in a domain within said three-dimensional space, said method comprising:

determining a spatial distribution state of said dot-sequences on said two-dimensional screen using uniform random numbers; and generating an image of said dot-sequences on said two-dimensional screen based on said spatial distribution state of said dot-sequences on said two-dimensional screen.

22. A method for projecting a plurality of dot-sequences existing in a three-dimensional space upon a hypothetical two-dimensional screen, given that said plurality of dot-sequences randomly exist in a domain within said three-dimensional space, said method comprising:

determining a spatial distribution state of said dot-sequences on said two-dimensional screen based on a one-dimensional Gaussian distribution generated from uniform random numbers using the Box-Muller method; and generating an image of said dot-sequences on said two-dimensional screen based on said spatial distribution state of said dot-sequences on said two-dimensional screen.

23. A method for projecting a plurality of dot-sequences existing in a three-dimensional space upon a hypothetical two-dimensional screen, given that said plurality of dot-sequences randomly exist in a domain within said three-dimensional space, said method comprising:

determining a spatial distribution state of said dot-sequences on said two-dimensional screen using a two-dimensional Gaussian distribution; and generating an image of said dot-sequences on said two-dimensional screen based on said spatial distribution state of said dot-sequences on said two-dimensional screen.

24. A method according to claim 23, wherein said distribution state of said dot-sequences on said two-dimensional screen is a probability density function g(x, y) expressed as follows:

$$g(x, y) = (1/2\pi)\exp\{-(x^2+y^2)/2\},$$

wherein said three-dimensional space is defined by x, y, and z coordinate axes; and said two-dimensional screen is oriented along the x and y axes.

25. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to determine a spatial distribution state of said dot-sequences on a two-dimensional screen based on a spatial distribution state of said dot-sequences in said three-dimensional space, and to generate an image of said dot-sequences on said two-dimensional screen according to said spatial distribution state of said dot-sequences on said two-dimensional screen.

26. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to: determine a spatial distribution state of said dot-sequences on a two-dimensional screen based on a spatial distribution state of said dot-sequences in said three-dimensional space, a point of view within said three-dimensional space from which to provide a reference for projecting said dot-sequences onto said two-dimensional screen, and a direction of view from said point of view toward said plurality of dot-sequences; and to generate an image of said dot-sequences on said two-dimensional screen according to said spatial distribution state of said dot-sequences on said two-dimensional screen.

27. An entertainment system for producing images for display on a display screen, said system comprising a graphics system including a graphics data generating processor operable to perform coordinate computation on primitives of said images, and given that a plurality of dot-sequences randomly exist in a domain within a three-dimensional space, said graphics data generating processor is further operable to determine a spatial distribution state of said dot-sequences on a two-dimensional screen using a two-dimensional Gaussian distribution, and to generate an image of said dot-sequences on said two-dimensional screen according to said spatial distribution state of said dot-sequences on said two-dimensional screen.

28. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences in said three-dimensional space, given that said plurality of dot-sequences randomly exist in a domain within said three-dimensional space;

determining a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

29. A storage medium according to claim 28, wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

30. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences in said three-dimensional space, given that said plurality of dot-sequences randomly exist in a domain within said three-dimensional space;

determining a point of view within said three-dimensional space from which to provide a reference for projecting said dot-sequences onto said two-dimensional screen;

determining a direction of view from said point of view toward said plurality of dot-sequences;

determining a spatial distribution state of said dot-sequences on said two-dimensional screen based on said spatial distribution state of said dot-sequences in said three-dimensional space, said point of view, and said direction of view; and generating an image of said dot-sequences on said two-dimensional screen based on said spatial distribution state of said dot-sequences on said two-dimensional screen.

31. A storage medium according to claim 25, wherein said distribution state of said dot-sequences on said two-dimensional screen is a probability density function $g(x, y)$ expressed as follows:

$$g(x, y) = \int_0^\infty f(X, Y, Z) \cdot (Z/h)^2 \, dZ,$$

wherein
   said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is $f(X, Y, Z)$;

a distance from said point of view to said two-dimensional screen is h; and a distance from said point of view to said dot-sequences existing within said three-dimensional space is Z.

32. A storage medium according to claim 30, wherein said distribution state of said dot-sequences on said two-dimensional screen is a probability density function $g(x, y)$ expressed as follows:

$$g(x, y) = \int_0^\infty f(x \cdot Z/h, y \cdot Z/h, Z) \cdot (Z/h)^2 \, dZ,$$

wherein
   said three-dimensional space is defined by x, y, and z coordinate axes;

said direction of view from said point of view toward said plurality of dot-sequences is the z axis;

said two-dimensional screen is oriented along the x and y axes;

a probability density function for said plurality of dot-sequences existing within said three-dimensional space is $f(X, Y, Z)$;

a distance from said point of view to said two-dimensional screen is h; and a distance from said point of view to said dot-sequences existing within said three-dimensional space is Z.

33. A storage medium according to claim 30, wherein said plurality of dot-sequences existing within said three-dimensional space are apex coordinates of polygons which are used to draw image objects.

34. A storage medium according to claim 30, wherein said plurality of dot-sequences existing within said three-dimensional space are coordinates for drawing at least one object selected from the group consisting of clouds, a water surface, and tree leaves.

35. A storage medium according to claim 30, wherein said spatial distribution state of said dot-sequences on said two-dimensional screen is represented by a probability density function on said two-dimensional screen, and said spatial distribution state of said dot-sequences in said three-dimensional space is represented by a probability density function in said three-dimensional space.

36. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen using uniform random numbers, given that said plurality of dot-sequences randomly exist in a domain within said three-dimensional space; and generating an image of said dot-sequences on said two-dimensional screen based on said spatial distribution state of said dot-sequences on said two-dimensional screen.

37. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen based on a one-dimensional Gaussian distribution generated from uniform random numbers using the Box-Muller method, given that said plurality of dot-sequences randomly exist in a domain within said three-dimensional space; and generating an image of said dot-sequences on said two-dimensional screen based on said spatial distribution state of said dot-sequences on said two-dimensional screen.

38. A storage medium upon which a program is stored, said program being operable to cause a processing system to project a plurality of dot-sequences existing in a three-dimensional space upon a hypothetical two-dimensional screen by performing steps comprising:

determining a spatial distribution state of said dot-sequences on said two-dimensional screen using a two-dimensional Gaussian distribution, given that said plurality of dot-sequences randomly exist in a domain within said three-dimensional space; and generating an image of said dot-sequences on said two-dimensional screen based on said spatial distribution state of said dot-sequences on said two-dimensional screen.

39. A storage medium according to claim 38, wherein said distribution state of said dot-sequences on said two-dimensional screen is a probability density function $g(x, y)$ expressed as follows:

$$g(x, y)=(1/2\pi)\exp\{-(x^2+y^2)/2\},$$

wherein said three-dimensional space is defined by x, y, and z coordinate axes; and said two-dimensional screen is oriented along the x and y axes.

40. An apparatus for projecting a plurality of dot-sequences existing in a three-dimensional space upon a hypothetical two-dimensional screen, said apparatus comprising:

a graphics data processor operable to (i) obtain a mathematical expression of a spatial distribution state of said dot-sequences in said three-dimensional space, given that said plurality of dot-sequences randomly exist in a domain within said three-dimensional space, and (ii) determine a mathematical expression of a spatial distribution state of said dot-sequences on said two-dimensional screen based on said spatial distribution state of said plurality of dot-sequences in said three-dimensional space; and a rendering processor operable to generate an image of said dot-sequences on said two-dimensional screen based on said mathematical expression of said spatial distribution state of said dot-sequences on said two-dimensional screen.

41. An apparatus according to claim 40, wherein:

said graphics data processor is further operable to (i) determine a point of view within said three-dimensional space from which to provide a reference for projecting said dot-sequences onto said two-dimensional screen, (ii) determine a direction of view from said point of view toward said plurality of dot-sequences; and said rendering processor is further operable to generate said image of said dot-sequences on said two-dimensional screen based on said mathematical expression of said spatial distribution state of said dot-sequences on said two-dimensional screen.

42. An apparatus according to claim 40, wherein said mathematical expression of said spatial distribution state of said dot-sequences on said two-dimensional screen is determined using uniform random numbers.

43. An apparatus according to claim 40, wherein said mathematical expression of said spatial distribution state of said dot-sequences on said two-dimensional screen is determined using a one-dimensional Gaussian distribution generated from uniform random numbers using the Box-Muller method.

44. An apparatus according to claim 40, wherein said mathematical expression of said spatial distribution state of said dot-sequences on said two-dimensional screen is determined using a two-dimensional Gaussian distribution.

45. An apparatus according to claim 40, wherein:

said mathematical expression of said spatial distribution state of said dot-sequences in said three-dimensional space is a probability density function in said three-dimensional space; and said mathematical expression of said spatial distribution state of said dot-sequences on said two-dimensional screen is a probability density function on said two-dimensional screen.

46. A method for projecting a plurality of dot-sequences existing in a three-dimensional space upon a hypothetical two-dimensional screen, said method comprising:

obtaining a mathematical expression of a spatial distribution state of said dot-sequences in said three-dimensional space, given that said plurality of dot-sequences randomly exist in a domain within said three-dimensional space;

determining a mathematical expression of a spatial distribution state of said dot-sequences on said two-dimensional screen based on said spatial distribution state of said plurality of dot-sequences in said three-dimensional space; and generating an image of said dot-sequences on said two-dimensional screen based on said spatial distribution state of said dot-sequences on said two-dimensional screen.

47. A method according to claim 46, further comprising:

determining a point of view within said three-dimensional space from which to provide a reference for projecting said dot-sequences onto said two-dimensional screen;

determining a direction of view from said point of view toward said plurality of dot-sequences; and generating said image of said dot-sequences on said two-dimensional screen based on said mathematical expression of said spatial distribution state of said dot-sequences on said two-dimensional screen.

48. A method according to claim 46, wherein said mathematical expression of said spatial distribution state of said dot-sequences on said two-dimensional screen is determined using uniform random numbers.

49. A method according to claim 46, wherein said mathematical expression of said spatial distribution state of said dot-sequences on said two-dimensional screen is determined using a one-dimensional Gaussian distribution generated from uniform random numbers using the Box-Muller method.

50. A method according to claim 46, wherein said mathematical expression of said spatial distribution state of said dot-sequences on said two-dimensional screen is determined using a two-dimensional Gaussian distribution.

51. A method according to claim 46, wherein:
said mathematical expression of said spatial distribution state of said dot-sequences in said three-dimensional space is a probability density function in said three-dimensional space; and
said mathematical expression of said spatial distribution state of said dot-sequences on said two-dimensional screen is a probability density function on said two-dimensional screen.

52. A storage medium containing a program operable to cause a processor to perform actions for projecting a plurality of dot-sequences existing in a three-dimensional space upon a hypothetical two-dimensional screen, said actions comprising:
obtaining a mathematical expression of a spatial distribution state of said dot-sequences in said three-dimensional space, given that said plurality of dot-sequences randomly exist in a domain within said three-dimensional space;
determining a mathematical expression of a spatial distribution state of said dot-sequences on said two-dimensional screen based on said spatial distribution state of said plurality of dot-sequences in said three-dimensional space; and
generating an image of said dot-sequences on said two-dimensional screen based on said spatial distribution state of said dot-sequences on said two-dimensional screen.

53. A recording medium according to claim 52, further comprising:
determining a point of view within said three-dimensional space from which to provide a reference for projecting said dot-sequences onto said two-dimensional screen;
determining a direction of view from said point of view toward said plurality of dot-sequences; and
generating said image of said dot-sequences on said two-dimensional screen based on said mathematical expression of said spatial distribution state of said dot-sequences on said two-dimensional screen.

54. A recording medium according to claim 52, wherein said mathematical expression of said spatial distribution state of said dot-sequences on said two-dimensional screen is determined using uniform random numbers.

55. A recording medium according to claim 52, wherein said mathematical expression of said spatial distribution state of said dot-sequences on said two-dimensional screen is determined using a one-dimensional Gaussian distribution generated from uniform random numbers using the Box-Muller method.

56. A recording medium according to claim 52, wherein said mathematical expression of said spatial distribution state of said dot-sequences on said two-dimensional screen is determined using a two-dimensional Gaussian distribution.

57. A recording medium according to claim 52, wherein:
said mathematical expression of said spatial distribution state of said dot-sequences in said three-dimensional space is a probability density function in said three-dimensional space; and
said mathematical expression of said spatial distribution state of said dot-sequences on said two-dimensional screen is a probability density function on said two-dimensional screen.

58. An apparatus, comprising:
a graphics processor operable to (i) receive a model of an object in three-dimensional space including a plurality of randomly distributed groups of one or more polygons, (ii) determine a first mathematical expression that represents said random distribution of said groups of one or more polygons in said three-dimensional space, and (iii) determine a second mathematical expression that represents a distribution of said groups of one or more polygons in a two-dimensional space based on said first mathematical expression; and
a rendering processor operable to render said groups of one or more polygons onto a two-dimensional plane of said two-dimensional space using said second mathematical expression.

59. An apparatus according to claim 58, wherein:
said graphics data processor is further operable to (i) determine a point of view within said three-dimensional space from which to provide a reference for projecting said polygons onto said two-dimensional screen, (ii) determine a direction of view from said point of view toward said polygons; and
said rendering processor is further operable to generate said image of said polygons on said two-dimensional screen based on said second mathematical expression.

60. An apparatus according to claim 58, wherein said second mathematical expression is determined using uniform random numbers.

61. An apparatus according to claim 58, wherein said second mathematical expression is determined using a one-dimensional Gaussian distribution generated from uniform random numbers using the Box-Muller method.

62. An apparatus according to claim 58, wherein said second mathematical expression is determined using a two-dimensional Gaussian distribution.

63. An apparatus according to claim 58, wherein:
said first mathematical expression of said spatial distribution state of said polygons in said three-dimensional space is a probability density function in said three-dimensional space; and
said second mathematical expression of said spatial distribution state of said polygons on said two-dimensional screen is a probability density function on said two-dimensional screen.

64. A method, comprising:
providing a model of an object in three-dimensional space including a plurality of randomly distributed groups of one or more polygons;
determining a first mathematical expression that represents said random distribution of said groups of one or more polygons in said three-dimensional space;
determining a second mathematical expression that represents a distribution of said groups of one or more polygons in a two-dimensional space based on said first mathematical expression; and
rendering said groups of one or more polygons onto a two-dimensional plane of said two-dimensional space using said second mathematical expression.

65. A method according to claim 64, further comprising:

determining a point of view within said three-dimensional space from which to provide a reference for projecting said polygons onto said two-dimensional screen;

determining a direction of view from said point of view toward said plurality of polygons; and generating said image of said polygons on said two-dimensional screen based on said second mathematical expression.

66. A method according to claim 64, wherein said second mathematical expression is determined using uniform random numbers.

67. A method according to claim 64, wherein said second mathematical expression is determined using a one-dimensional Gaussian distribution generated from uniform random numbers using the Box-Muller method.

68. A method according to claim 64, wherein said second mathematical expression is determined using a two-dimensional Gaussian distribution.

69. A method according to claim 64, wherein:

said first mathematical expression of said spatial distribution state of said polygons in said three-dimensional space is a probability density function in said three-dimensional space; and said second mathematical expression of said spatial distribution state of said polygons on said two-dimensional screen is a probability density function on said two-dimensional screen.

70. A storage medium containing a program operable to cause a processor to perform actions, said actions comprising:

receiving a model of an object in three-dimensional space including a plurality of randomly distributed groups of one or more polygons;

determining a first mathematical expression that represents said random distribution of said groups of one or more polygons in three-dimensional space;

determining a second mathematical expression that represents a distribution of said groups of one or more polygons in a two-dimensional space based on said first mathematical expression; and rendering said groups of one or more polygons onto a two-dimensional plane of said two-dimensional space using said second mathematical expression.

71. A storage medium according to claim 70, further comprising:

determining a point of view within said three-dimensional space from which to provide a reference for projecting said polygons onto said two-dimensional screen;

determining a direction of view from said point of view toward said plurality of polygons; and generating said image of said polygons on said two-dimensional screen based on said second mathematical expression.

72. A storage medium according to claim 70, wherein said second mathematical expression is determined using uniform random numbers.

73. A storage medium according to claim 70, wherein said second mathematical expression is determined using a one-dimensional Gaussian distribution generated from uniform random numbers using the Box-Muller method.

74. A storage medium according to claim 70, wherein said second mathematical expression is determined using a two-dimensional Gaussian distribution.

75. A storage medium according to claim 70, wherein:

said first mathematical expression of said spatial distribution state of said polygons in said three-dimensional space is a probability density function in said three-dimensional space; and said second mathematical expression of said spatial distribution state of said polygons on said two-dimensional screen is a probability density function on said two-dimensional screen.

\* \* \* \* \*

UNITED STATES PATENT AND TRADEMARK OFFICE
CERTIFICATE OF CORRECTION

| | |
|---|---|
| PATENT NO. | : 6,867,766 B1 |
| APPLICATION NO. | : 09/577736 |
| DATED | : March 15, 2005 |
| INVENTOR(S) | : Masaaki Oka |

It is certified that error appears in the above-identified patent and that said Letters Patent is hereby corrected as shown below:

On the Title page, item (57) ABSTRACT, line 6, delete "," and insert --.--
Line 6, delete "an generate an image of dot-sequences" and insert --An image of dot-sequences is generated--.
Line 9, delete "to" and insert therefor --as--.
Column 9, line 34, delete "areas" and insert therefor --are as--.
Column 12, line 34, after "large" delete ",".
Column 12, line 67, after "numbers" insert --.--.

Signed and Sealed this

Thirtieth Day of January, 2007

JON W. DUDAS
*Director of the United States Patent and Trademark Office*